US012668022B2

(12) United States Patent
Discekici et al.

(10) Patent No.: US 12,668,022 B2
(45) Date of Patent: Jun. 30, 2026

(54) THREE-DIMENSIONAL PRINTING

(71) Applicant: PERIDOT PRINT LLC, Palo Alto, CA (US)

(72) Inventors: Emre Hiro Discekici, San Diego, CA (US); Graciela E Negri Jimenez, San Diego, CA (US); Shannon Reuben Woodruff, San Diego, CA (US); Alay Yemane, San Diego, CA (US); Mark H. Kowalski, Corvallis, OR (US)

(73) Assignee: Peridot Print LLC, Palo Alto, CA (US)

( * ) Notice: Subject to any disclaimer, the term of this patent is extended or adjusted under 35 U.S.C. 154(b) by 353 days.

(21) Appl. No.: 18/033,930

(22) PCT Filed: Oct. 30, 2020

(86) PCT No.: PCT/US2020/058161
§ 371 (c)(1),
(2) Date: Apr. 26, 2023

(87) PCT Pub. No.: WO2022/093262
PCT Pub. Date: May 5, 2022

(65) Prior Publication Data

US 2024/0025113 A1 Jan. 25, 2024

(51) Int. Cl.

| | |
|---|---|
| ***B29C 64/188*** | (2017.01) |
| ***B29C 64/165*** | (2017.01) |
| ***B29C 64/30*** | (2017.01) |
| ***B29C 71/00*** | (2006.01) |
| ***B29C 71/04*** | (2006.01) |
| ***B33Y 10/00*** | (2015.01) |
| ***B33Y 40/20*** | (2020.01) |

(52) U.S. Cl.
CPC .......... *B29C 64/188* (2017.08); *B29C 64/165* (2017.08); *B29C 64/30* (2017.08); *B29C 71/0009* (2013.01); *B29C 71/04* (2013.01); *B33Y 10/00* (2014.12); *B33Y 40/20* (2020.01)

(58) Field of Classification Search
CPC ...... B29C 64/188; B29C 30/165; B33Y 10/00
See application file for complete search history.

(56) References Cited

U.S. PATENT DOCUMENTS

| | | | |
|---|---|---|---|
| 5,482,659 A * | 1/1996 | Sauerhoefer ........ | B29C 71/0009 264/572 |
| 10,343,331 B2 | 7/2019 | Mccall et al. | |
| 2008/0169585 A1 | 7/2008 | Zinniel | |

(Continued)

FOREIGN PATENT DOCUMENTS

| | | |
|---|---|---|
| CN | 211390169 U | 9/2020 |
| GB | 2513571 A | 11/2014 |
| WO | 2014/197086 A1 | 12/2014 |

(Continued)

*Primary Examiner* — Edmund H Lee
(74) *Attorney, Agent, or Firm* — Dierker & Kavanaugh, P.C.

(57) ABSTRACT

In an example of a surface treatment method, a three-dimensionally printed polyamide object is used. In the surface treatment method, the three-dimensionally printed polyamide object is first exposed to benzyl alcohol. In the surface treatment method, the three-dimensionally printed polyamide object is exposed to microwave irradiation after the benzyl alcohol exposure.

17 Claims, 5 Drawing Sheets

(56) References Cited

U.S. PATENT DOCUMENTS

| | | | |
|---|---|---|---|
| 2016/0074911 | A1 | 3/2016 | Dore |
| 2020/0238620 | A1 | 7/2020 | Crabtree et al. |

FOREIGN PATENT DOCUMENTS

| | | | | |
|---|---|---|---|---|
| WO | WO2017112571 | | * | 6/2017 |
| WO | 2018/023833 | A1 | | 2/2018 |
| WO | 2019/185756 | A1 | | 10/2019 |
| WO | 2019/201922 | A1 | | 10/2019 |
| WO | WO2019201922 | | * | 10/2019 |
| WO | 2020/049186 | A1 | | 3/2020 |

* cited by examiner

THREE-DIMENSIONAL PRINTING

BACKGROUND

Three-dimensional (3D) printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material (which, in some examples, may include build material, binder and/or other printing liquid(s), or combinations thereof). This is unlike traditional machining processes, which often rely upon the removal of material to create the final part. Some 3D printing methods use chemical binders or adhesives to bind build materials together. Other 3D printing methods involve at least partial coalescence of the build material, and the mechanism for material coalescence (e.g., curing, thermal merging/fusing, melting, sintering, etc.) may depend upon the type of build material used. For some materials, at least partial coalescence may be accomplished using heat-assisted extrusion, and for some other materials (e.g., polymerizable materials), curing or fusing may be accomplished using, for example, infrared light.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Some examples of three-dimensional (3D) printing may utilize a fusing agent (including an electromagnetic radiation absorber) to pattern polymeric build material, such as polyamide build material. In these examples, an entire layer of the polyamide build material is exposed to electromagnetic radiation, but the patterned region (which, in some instances, is less than the entire layer) of the polyamide build material is fused/coalesced and hardened to become a layer of a 3D part. In the patterned region, the fusing agent is capable of at least partially penetrating into voids between the polyamide build material particles, and is also capable of spreading onto the exterior surface of the polyamide build material particles. This fusing agent is capable of absorbing radiation and converting the absorbed radiation to thermal energy, which in turn fuses/coalesces the polyamide build material that is in contact with the fusing agent. Fusing/coalescing causes the polymeric build material to join or blend to form a single entity (i.e., the layer of the 3D part). Fusing/coalescing may involve at least partial thermal merging, melting, binding, and/or some other mechanism that coalesces the polyamide build material to form the layer of the 3D printed polyamide object.

The surface properties of objects printed in this manner may be rough and include defects that are difficult to fix. Both physical and chemical post-printing finishing techniques have been used to reduce surface roughness and defects of 3D printed objects. Some physical processes, such as sanding, can deleteriously impact object accuracy and color. Furthermore, polyamides include repeat units with long carbon chain lengths, which render them relatively chemically inert. Because polyamides are relatively chemically inert, they are not readily soluble in many solvents. Thus, chemical finishing processes for 3D printed polyamide objects may involve harsh (e.g., corrosive, etc.) solvents, such as strong acids (e.g., formic acid), phenols, some aliphatic fluorinated alcohols, etc. Such solvents can complicate post-processing (e.g., may involve more rigorous conditions) and/or may be undesirable.

A post-print finishing technique for 3D printed polyamide objects is disclosed herein. This post-print finishing technique is a surface treatment method that utilizes benzyl alcohol in liquid form and microwave irradiation.

Figure 1:
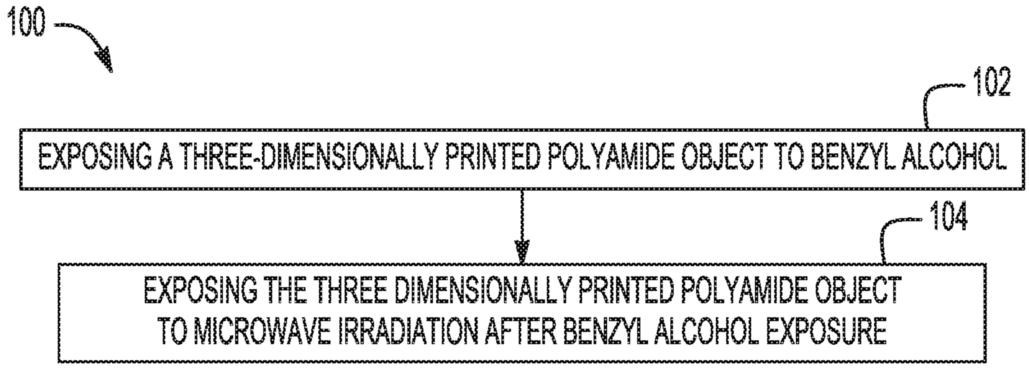
FIG. 1 is a flow diagram depicting an example of a surface treating method disclosed herein.

As shown in FIG. 1, the surface treatment method 100 includes exposing a three-dimensionally printed polyamide object to benzyl alcohol (reference numeral 102); and exposing the three-dimensionally printed polymeric object to microwave irradiation after benzyl alcohol exposure (reference numeral 104). In these instances, the polyamide object may be 3D printed using any example of the 3D printing method disclosed herein, which are described in detail in reference to FIG. 3 through FIG. 6.

Figure 2:
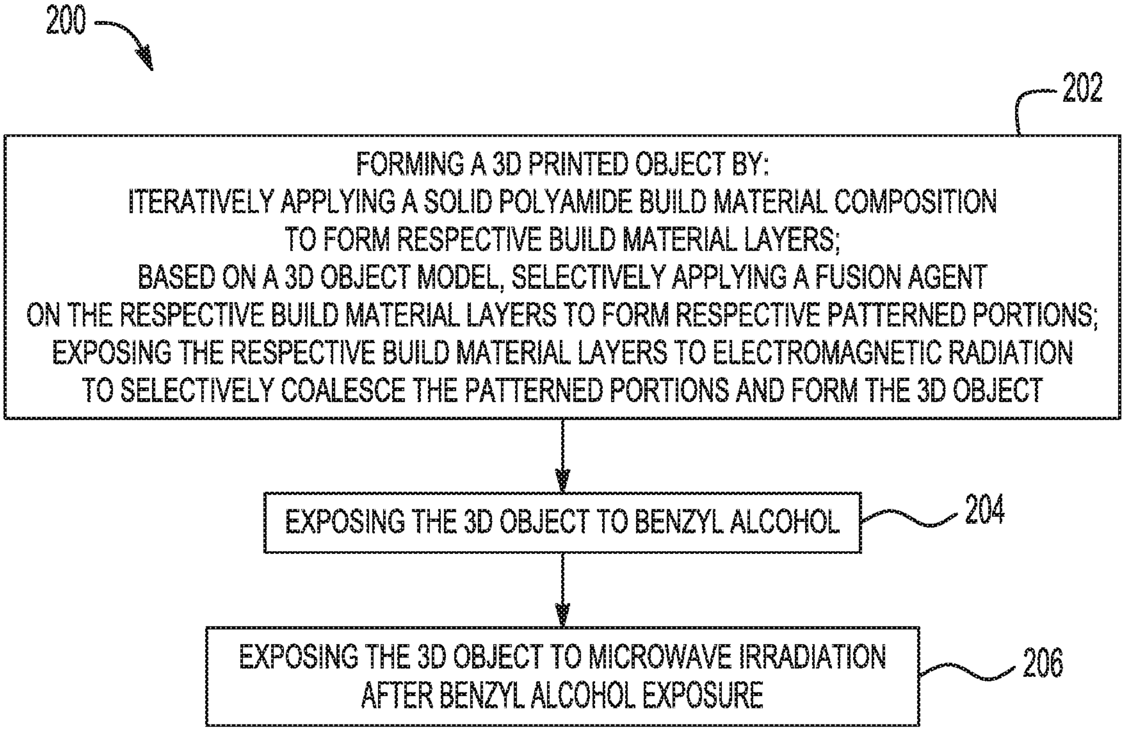
FIG. 2 is a flow diagram depicting an example of a 3D printing method including the post-print surface treating method of FIG. 1.

As shown in FIG. 2, other examples of the method 200 include forming a 3D printed object by iteratively applying a solid polyamide build material composition to form respective build material layers; based on a 3D object model, selectively applying a fusing agent on the respective build material layers to form respective patterned portions; exposing the respective build material layers to electromagnetic radiation to selectively coalesce the patterned portions and form the 3D printed polyamide object (reference numeral 202); exposing the 3D printed polyamide object to benzyl alcohol (reference numeral 204); and exposing the 3D printed polyamide object to microwave irradiation after benzyl alcohol exposure (reference numeral 206). In these instances, the iterative formation of the object layers may be performed using any of the examples described in reference to FIG. 3 through FIG. 6.

In both the methods 100, 200, the 3D printed polyamide object is exposed to benzyl alcohol, and then the 3D printed polyamide object is exposed to microwave irradiation after the benzyl alcohol exposure. This process reduces the surface roughness of the 3D printed polyamide object. The improvement in surface roughness may be due to the combination of i) benzyl alcohol and ii) heat during microwave radiation exposure. The benzyl alcohol and heat may help to solubilize the polyamide build material particles at the surface of the 3D printed polyamide object. The solubilized particles are able to undergo additional coalescence, which can decrease overall roughness.

Throughout this disclosure, a weight percentage that is referred to as "wt % active" refers to the loading of an active component of a dispersion or other formulation that is present, e.g., in the surface treating agent, fusing agent, detailing agent, etc. For example, an electromagnetic radiation absorber, such as carbon black, may be present in a water-based formulation (e.g., a stock solution or dispersion) before being incorporated into the fusing agent vehicle. In this example, the wt % actives of the carbon black accounts for the loading (as a weight percent) of the carbon black solids that are present in the fusing agent, and does not account for the weight of the other components (e.g., water, etc.) that are present in the stock solution or dispersion with the carbon black. The term "wt %," without the term actives, refers to the loading of a 100% active component that does not include other non-active components therein.

Polyamide Build Material Composition

The surface treating method disclosed herein is suitable for 3D printed objects that are formed with a solid polyamide build material composition.

The solid polyamide build material composition includes at least polyamide particles. Examples of suitable polyamides include polyamide-11 (PA 11/nylon 11), polyamide-12 (PA 12/nylon 12), polyamide-6 (PA 6/nylon 6), polyamide-8 (PA 8/nylon 8), polyamide-9 (PA 9/nylon 9), polyamide-66 (PA 66/nylon 66), polyamide-612 (PA 612/nylon 612), polyamide-812 (PA 812/nylon 812), polyamide-912 (PA 912/nylon 912), etc.), a thermoplastic polyamide (TPA), and combinations thereof.

The polyamide particles are in solid form, e.g., a powder or a powder-like material. The powder-like material includes, for example, short fibers having a length that is greater than its width. In some examples, the powder or powder-like material may be formed from, or may include, short fibers that may, for example, have been cut into short lengths from long strands or threads of material.

The polyamide particles may be made up of similarly sized particles and/or differently sized particles. In an example, the average particle size of the solid polyamide particles ranges from about 2 μm to about 225 μm. The term "average particle size", as used herein, may refer to a number-weighted mean diameter or a volume-weighted mean diameter of a particle distribution. In another example, the average particle size of the solid polyamide particles ranges from about 10 μm to about 130 μm. In some instances, the average particle size represents D50, or the size that splits the distribution with half above and half below the given diameter.

When the solid polyamide build material composition includes crystalline or semi-crystalline polyamide particles, the solid polyamide build material composition may have a wide processing window of greater than 5° C., which can be defined by the temperature range between the melting point and the re-crystallization temperature. In an example, the solid polyamide build material composition may have a melting point ranging from about 50° C. to about 300° C. As other examples, the solid polyamide build material composition may have a melting point ranging from about 155° C. to about 225° C., from about 155° C. to about 215° C., about 160° C. to about 200° C., from about 170° C. to about 190° C., or from about 182° C. to about 189° C. As still another example, the solid polyamide build material composition may have a melting point of about 180° C.

When the solid polyamide build material composition includes thermoplastic polyamide particles, the polyamide build material composition may have a melting range within the range of from about 130° C. to about 250° C.

In some examples, the solid polyamide build material composition does not substantially absorb radiation having a wavelength within the range of 300 nm to 1400 nm. The phrase "does not substantially absorb" means that the absorptivity of the solid polyamide build material composition at a particular wavelength is 25% or less (e.g., 20%, 10%, 5%, etc.)

In some examples, in addition to the polyamide particles, the solid polyamide build material composition may include other solids, such as an antioxidant, a whitener, an antistatic agent, a flow aid, or a combination thereof. While several examples of these solid additives are provided, it is to be understood that these solid additives are selected to be thermally stable (i.e., will not decompose) at the 3D printing temperatures.

Antioxidant(s) may be added to the solid polyamide build material composition to prevent or slow molecular weight decreases of the polyamide particles and/or to prevent or slow discoloration (e.g., yellowing) by preventing or slowing oxidation of the polyamide particles. In some examples, the polyamide particles may discolor upon reacting with oxygen, and this discoloration may contribute to the discoloration of the solid polyamide build material composition. The antioxidant may be selected to minimize discoloration. In some examples, the antioxidant may be a radical scavenger. In these examples, the antioxidant may include IRGANOX® 1098 (benzenepropanamide, N,N'-1,6-hexanediylbis(3,5-bis(1,1-dimethylethyl)-4-hydroxy)), IRGANOX® 254 (a mixture of 40% triethylene glycol bis(3-tert-butyl-4-hydroxy-5-methylphenyl), polyvinyl alcohol and deionized water), and/or other sterically hindered phenols. In other examples, the antioxidant may include a phosphite and/or an organic sulfide (e.g., a thioester). The antioxidant may be in the form of fine particles (e.g., having an average particle size of 5 μm or less) that are dry blended with the polyamide particles. In an example, the antioxidant may be included in the solid polyamide build material composition in an amount ranging from about 0.01 wt % to about 5 wt %, based on the total weight of the solid polyamide build material composition. In other examples, the antioxidant may be included in the solid polyamide build material composition in an amount ranging from about 0.01 wt % to about 2 wt % or from about 0.2 wt % to about 1 wt %, based on the total weight of the polyamide build material composition.

Whitener(s) may be added to the solid polyamide build material composition to improve visibility. Examples of suitable whiteners include titanium dioxide ($TiO_2$), zinc oxide (ZnO), calcium carbonate ($CaCO_3$), zirconium dioxide ($ZrO_2$), aluminum oxide ($Al_2O_3$), silicon dioxide ($SiO_2$), boron nitride (BN), and combinations thereof. In some examples, a stilbene derivative may be used as the whitener and a brightener. In these examples, the temperature(s) of the 3D printing process may be selected so that the stilbene derivative remains stable (i.e., the 3D printing temperature does not thermally decompose the stilbene derivative). In an example, any example of the whitener may be included in the solid polyamide build material composition in an amount ranging from greater than 0 wt % to about 10 wt %, based on the total weight of the solid polyamide build material composition.

Antistatic agent(s) may be added to the solid polyamide build material composition to suppress tribo-charging. Examples of suitable antistatic agents include aliphatic amines (which may be ethoxylated), aliphatic amides, quaternary ammonium salts (e.g., behentrimonium chloride or cocamidopropyl betaine), esters of phosphoric acid, polyethylene glycolesters, or polyols. Some suitable commercially available antistatic agents include HOSTASTAT® FA 38 (natural based ethoxylated alkylamine), HOSTASTAT® FE2 (fatty acid ester), and HOSTASTAT® HS 1 (alkane sulfonate), each of which is available from Clariant Int. Ltd.). In an example, the antistatic agent is added in an amount ranging from greater than 0 wt % to less than 5 wt %, based upon the total weight of the solid polyamide build material composition.

Flow aid(s) may be added to improve the coating flowability of the solid polyamide build material composition. Flow aids may be particularly beneficial when the polyamide particles have an average particle size less than 25 μm. The flow aid improves the flowability of the solid polyamide build material composition by reducing the friction, the lateral drag, and the tribocharge buildup (by increasing the particle conductivity). Examples of suitable flow aids include aluminum oxide ($Al_2O_3$), tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminum silicate (E555), calcium aluminosilicate (E556), bentonite (E558), aluminum silicate (E559), stearic acid (E570), and polydimethylsiloxane (E900). In an example, the flow aid is added in an amount ranging from greater than 0 wt % to less than 5 wt %, based upon the total weight of the solid polyamide build material composition.

Fusing Agents

In the examples disclosed herein, the 3D printed polyamide object may be formed by applying a fusing agent onto the solid polyamide build material composition and exposing the solid polyamide build material composition to electromagnetic radiation.

The fusing agents that may be used include an electromagnetic radiation absorber, which absorbs radiation and generates heat sufficient to coalesce/fuse the polyamide build material composition in contact therewith during 3D printing.

One example of the fusing agent is a core fusing agent, and the electromagnetic radiation absorber (also referred to as an energy absorber or active material) in the core fusing agent has absorption at least at wavelengths ranging from 400 nm to 780 nm (e.g., in the visible region). The electromagnetic radiation absorber in the core fusing agent may also absorb energy in the infrared region (e.g., 800 nm to 4000 nm). During 3D printing, the absorption of the electromagnetic radiation absorber generates heat suitable for coalescing/fusing the polyamide build material composition in contact therewith, which leads to 3D printed polyamide objects (or 3D printed polyamide regions) having mechanical integrity and relatively uniform mechanical properties (e.g., strength, elongation at break, etc.). This absorption, however, also results in strongly colored, e.g., black, 3D printed objects (or 3D printed object regions).

Another example of the fusing agent is a primer fusing agent, and the electromagnetic radiation absorber in the primer fusing agent is a plasmonic resonance absorber having absorption at wavelengths ranging from 800 nm to 4000 nm and having transparency at wavelengths ranging from 400 nm to 780 nm. This absorption and transparency allows the primer fusing agent to absorb enough radiation to coalesce/fuse the build material composition in contact therewith, while enabling the 3D printed polyamide objects (or 3D printed regions) to be white or slightly colored. The primer fusing agent may also be referred to as a low tint fusing agent.

Still other examples of the electromagnetic radiation absorber absorb some or all of the wavelengths within the range of 400 nm to 4000 nm. Examples include glass fibers, titanium dioxide, clay, mica, talc, barium sulfate, calcium carbonate, phosphate pigments, and/or silicate pigments. These energy absorbers are often white or lightly colored and may be used in either the core fusing agent or the primer fusing agent.

Phosphate pigments may have a variety of counterions, such as copper, zinc, iron, magnesium, calcium, strontium, the like, and combinations thereof. Examples of phosphates can include $M_2P_2O_7$, $M_4P_2O_9$, $M_5P_2O_{10}$, $M_3(PO_4)_2$, $M(PO_3)_2$, $M_2P_4O_{12}$, and combinations thereof, where M represents a counterion having an oxidation state of $+_2$, such as those listed above or a combination thereof. For example, $M_2P_2O_7$ can include compounds such as $Cu_2P_2O_7$, $Cu/MgP_2O_7$, $Cu/ZnP_2O_7$, or any other suitable combination of counterions. Silicates can have the same or similar counterions as phosphates. Example silicates can include $M_2SiO_4$, $M_2Si_2O_6$, and other silicates where M is a counterion having an oxidation state of $+_2$. For example, the silicate $M_2Si_2O_6$ can include $Mg_2Si_2O_6$, $Mg/CaSi_2O_6$, $MgCuSi_2O_6$, $Cu_2Si_2O_6$, $Cu/ZnSi_2O_6$, or other suitable combination of counterions. It is noted that the phosphates and silicates described herein are not limited to counterions having a +2 oxidation state, and that other counterions can also be used to prepare other suitable near-infrared pigments.

As used herein "absorption" means that at least 80% of radiation having wavelengths within the specified range is absorbed. Also used herein, "transparency" means that 25% or less of radiation having wavelengths within the specified range is absorbed.

Core Fusing Agent

Some examples of the core fusing agent are dispersions including the electromagnetic radiation absorber, having absorption at least at wavelengths ranging from 400 nm to 780 nm, and in some instances from about 400 nm to about 4000 nm. In some examples, the electromagnetic radiation absorber may be an infrared light absorbing colorant. In an example, the electromagnetic radiation absorber is a near-infrared light absorbing colorant. Any near-infrared colorants, e.g., those produced by Fabricolor, Eastman Kodak, or BASF, Yamamoto, may be used in the core fusing agent. As one example, the core fusing agent may be a printing liquid formulation including carbon black as the active material. Examples of this printing liquid formulation are commercially known as CM997A, 516458, C18928, C93848, C93808, or the like, all of which are available from HP Inc.

As another example, the core fusing agent may be a printing liquid formulation including near-infrared absorbing dyes as the active material. Examples of this printing liquid formulation are described in U.S. Pat. No. 9,133,344, incorporated herein by reference in its entirety. Some examples of the near-infrared absorbing dye are water-soluble near-infrared absorbing dyes selected from the group consisting of:

-continued

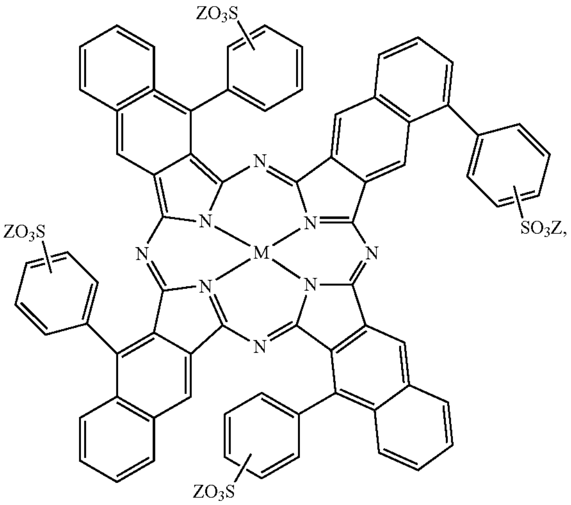

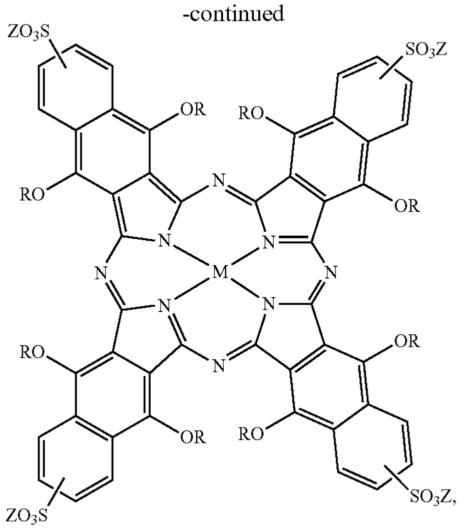

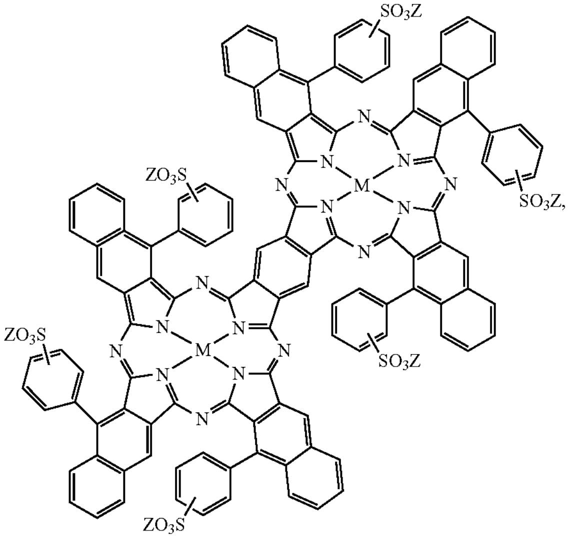

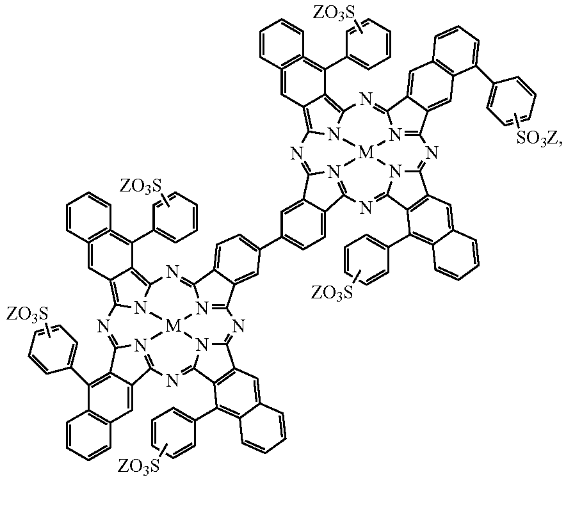

and mixtures thereof. In the above formulations, M can be a divalent metal atom (e.g., copper, etc.) or can have $OSO_3Na$ axial groups filling any unfilled valencies if the metal is more than divalent (e.g., indium, etc.), R can be hydrogen or any $C_1$-$C_8$ alkyl group (including substituted alkyl and unsubstituted alkyl), and Z can be a counterion such that the overall charge of the near-infrared absorbing dye is neutral. For example, the counterion can be sodium, lithium, potassium, $NH_4^+$, etc.

Some other examples of the near-infrared absorbing dye are hydrophobic near-infrared absorbing dyes selected from the group consisting of:

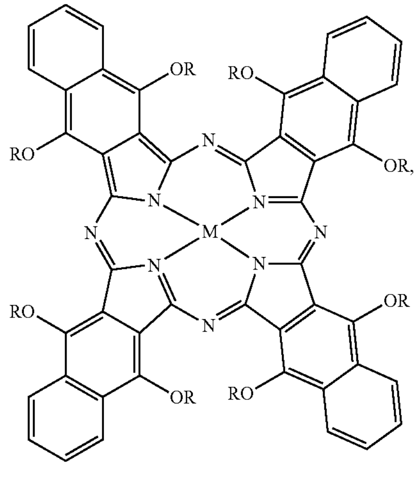

-continued

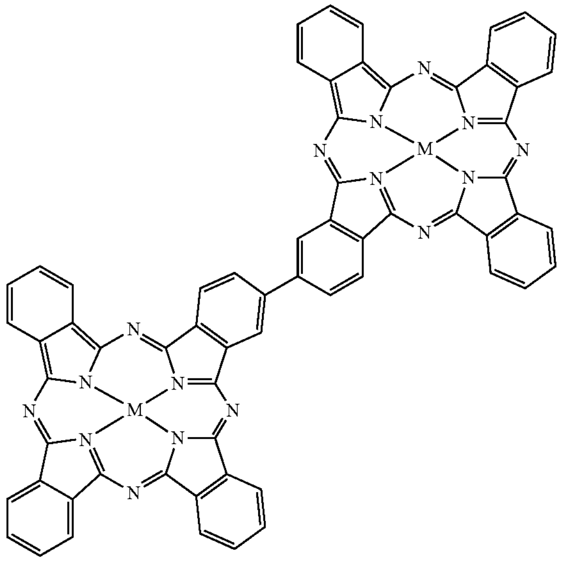

,

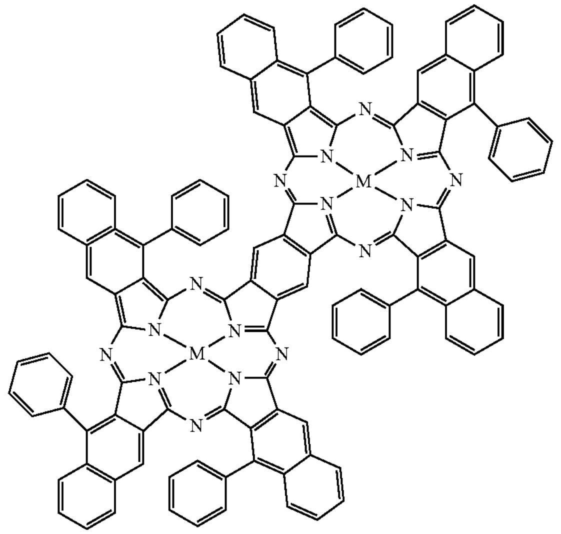

, and mixtures thereof. For the hydrophobic near-infrared absorbing dyes, M can be a divalent metal atom (e.g., copper, etc.) or can include a metal that has Cl, Br, or OR' (R'=H, $CH_3$, $COCH_3$, $COCH_2COOCH_3$, $COCH_2COCH_3$) axial groups filling any unfilled valencies if the metal is more than divalent, and R can be hydrogen or any $C_1$-$C_8$ alkyl group (including substituted alkyl and unsubstituted alkyl).

Other near-infrared absorbing dyes or pigments may be used in the core fusing agent. Some examples include anthraquinone dyes or pigments, metal dithiolene dyes or pigments, cyanine dyes or pigments, perylenediimide dyes or pigments, croconium dyes or pigments, pyrilium or thiopyrilium dyes or pigments, boron-dipyrromethene dyes or pigments, or aza-boron-dipyrromethene dyes or pigments.

Anthraquinone dyes or pigments and metal (e.g., nickel) dithiolene dyes or pigments may have the following structures, respectively:

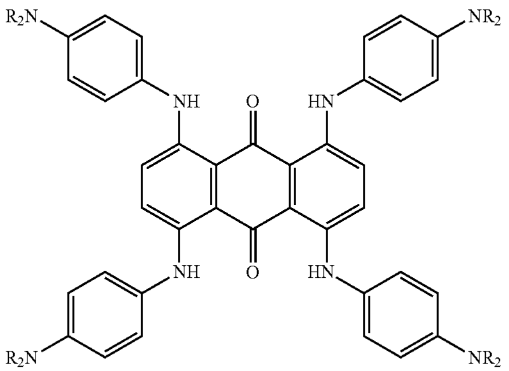

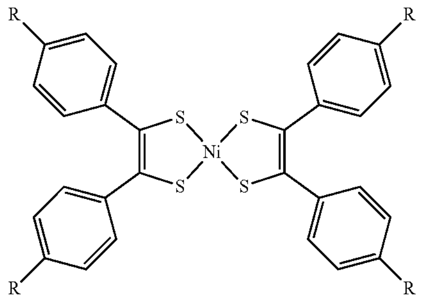

where R in the anthraquinone dyes or pigments may be hydrogen or any $C_1$-$C_8$ alkyl group (including substituted alkyl and unsubstituted alkyl), and R in the dithiolene may be hydrogen, COOH, $SO_3$, $NH_2$, any $C_1$-$C_8$ alkyl group (including substituted alkyl and unsubstituted alkyl), or the like.

Cyanine dyes or pigments and perylenediimide dyes or pigments may have the following structures, respectively:

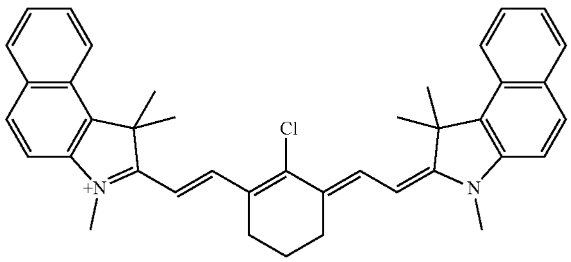

Cyanine dyes/pigments

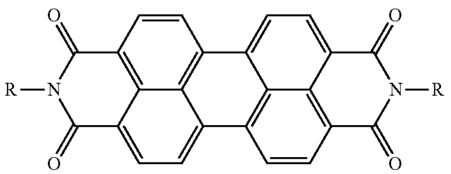

Perylenediimide dyes/pigments where R in the perylenediimide dyes or pigments may be hydrogen or any $C_1$-$C_8$ alkyl group (including substituted alkyl and unsubstituted alkyl).

Croconium dyes or pigments and pyrilium or thiopyrilium dyes or pigments may have the following structures, respectively:

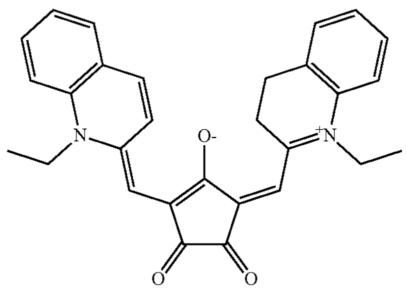

Croconium dyes/pigments

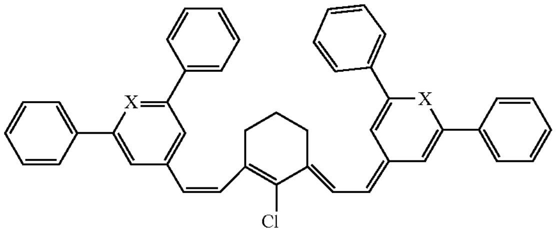

Pyrilium (X = O), thiopyrilium (X = S) dyes/pigments

Boron-dipyrromethene dyes or pigments and aza-boron-dipyrromethene dyes or pigments may have the following structures, respectively:

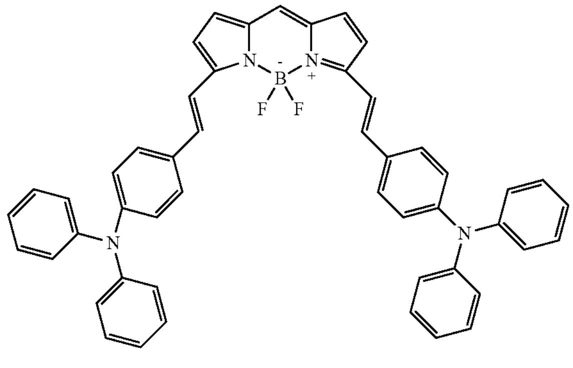

boron-dipyrromethene dyes/pigments

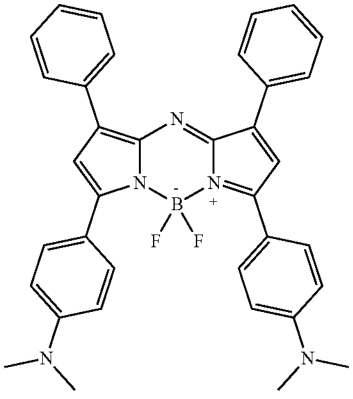

aza-boron-dipyrromethene dyes/pigments

Other suitable near-infrared absorbing dyes may include aminium dyes, tetraaryldiamine dyes, phthalocyanine dyes, and others.

Other near infrared absorbing materials include conjugated polymers (i.e., a polymer that has a backbone with alternating double and single bonds), such as poly(3,4-ethylenedioxythiophene)-poly(styrenesulfonate) (PEDOT:PSS), a polythiophene, poly(p-phenylene sulfide), a polyaniline, a poly(pyrrole), a poly(acetylene), poly(p-phenylene vinylene), polyparaphenylene, or combinations thereof.

The amount of the electromagnetic radiation absorber/energy absorber/active material that is present in the core fusing agent ranges from greater than 0 wt % active to about 40 wt % active based on the total weight of the core fusing agent. In other examples, the amount of the active material in the core fusing agent ranges from about 0.3 wt % active to 30 wt % active, from about 1 wt % active to about 20 wt % active, from about 1.0 wt % active up to about 10.0 wt % active, or from greater than 4.0 wt % active up to about 15.0 wt % active. It is believed that these active material loadings provide a balance between the core fusing agent having jetting reliability and heat and/or radiation absorbance efficiency.

Primer Fusing Agent

Some examples of the primer fusing agent are dispersions including the electromagnetic radiation absorber that has absorption at wavelengths ranging from 800 nm to 4000 nm and transparency at wavelengths ranging from 400 nm to 780 nm. The absorption of this electromagnetic radiation absorber may be the result of plasmonic resonance effects. Electrons associated with the atoms of the electromagnetic radiation absorber may be collectively excited by radiation, which results in collective oscillation of the electrons. The wavelengths that can excite and oscillate these electrons collectively are dependent on the number of electrons present in the electromagnetic radiation absorber particles, which in turn is dependent on the size of the electromagnetic radiation absorber particles. The amount of energy that can collectively oscillate the particle's electrons is low enough that very small particles (e.g., 1-100 nm) may absorb radiation with wavelengths several times (e.g., from 8 to 800 or more times) the size of the particles. The use of these particles allows the primer fusing agent to be inkjet jettable as well as electromagnetically selective (e.g., having absorption at wavelengths ranging from 800 nm to 4000 nm and transparency at wavelengths ranging from 400 nm to 780 nm).

In an example, the electromagnetic radiation absorber of the primer fusing agent has an average particle size (e.g., volume-weighted mean diameter) ranging from greater than 0 nm to less than 220 nm. In another example, the electromagnetic radiation absorber has an average particle size ranging from greater than 0 nm to 120 nm. In a still another example, the electromagnetic radiation absorber has an average particle size ranging from about 10 nm to about 200 nm.

In an example, the electromagnetic radiation absorber of the primer fusing agent is an inorganic pigment. Examples of suitable inorganic pigments include lanthanum hexaboride ($LaB_6$), tungsten bronzes ($A_xWO_3$), indium tin oxide ($In_2O_3$:$SnO_2$, ITO), antimony tin oxide ($Sb_2O_3$:$SnO_2$, ATO), titanium nitride (TiN), aluminum zinc oxide (AZO), ruthenium oxide ($RuO_2$), iron pyroxenes ($A_xFe_ySi_2O_6$ wherein A is Ca or Mg, x=1.5-1.9, and y=0.1-0.5), modified iron phosphates ($A_xFe_yPO_4$), modified copper phosphates ($A_xCu_yPO_z$), and modified copper pyrophosphates ($A_xCu_yP_2O_7$). Tungsten bronzes may be alkali doped tungsten oxides. Examples of suitable alkali dopants (i.e., A in $A_xWO_3$) may be cesium, sodium, potassium, or rubidium. In an example, the alkali doped tungsten oxide may be doped in an amount ranging from greater than 0 mol % to about 0.33 mol % based on the total mol % of the alkali doped tungsten oxide. Suitable modified iron phosphates ($A_xFe_yPO$) may include copper iron phosphate (A=Cu, x=0.1-0.5, and y=0.5-0.9), magnesium iron phosphate (A=Mg, x=0.1-0.5, and y=0.5-0.9), and zinc iron phosphate (A=Zn, x=0.1-0.5, and y=0.5-0.9). For the modified iron phosphates, it is to be understood that the number of phosphates may change based on the charge balance with the cations. Suitable modified copper pyrophosphates ($A_xCu_yP_2O_7$) include iron copper pyrophosphate (A=Fe, x=0-2, and y=0-2), magnesium copper pyrophosphate (A=Mg, x=0-2, and y=0-2), and zinc copper pyrophosphate (A=Zn, x=0-2, and y=0-2). Combinations of the inorganic pigments may also be used.

The amount of the electromagnetic radiation absorber that is present in the primer fusing agent ranges from greater than 0 wt % active to about 40 wt % active based on the total weight of the primer fusing agent. In other examples, the amount of the electromagnetic radiation absorber in the primer fusing agent ranges from about 0.3 wt % active to 30 wt % active, from about 1 wt % active to about 20 wt % active, from about 1.0 wt % active up to about 10.0 wt % active, or from greater than 4.0 wt % active up to about 15.0 wt % active. It is believed that these electromagnetic radiation absorber loadings provide a balance between the primer fusing agent having jetting reliability and heat and/or radiation absorbance efficiency.

The electromagnetic radiation absorber of the primer fusing agent may, in some instances, be dispersed with a dispersant. As such, the dispersant helps to uniformly distribute the electromagnetic radiation absorber throughout the primer fusing agent. Examples of suitable dispersants include polymer or small molecule dispersants, charged groups attached to the electromagnetic radiation absorber surface, or other suitable dispersants. Some specific examples of suitable dispersants include a water-soluble acrylic acid polymer (e.g., CARBOSPERSE® K7028 available from Lubrizol), water-soluble styrene-acrylic acid copolymers/resins (e.g., JONCRYL®296, JONCRYL® 671, JONCRYL® 678, JONCRYL® 680, JONCRYL® 683, JONCRYL® 690, etc. available from BASF Corp.), a high molecular weight block copolymer with pigment affinic groups (e.g., DISPERBYK®-190 available BYK Additives and Instruments), or water-soluble styrene-maleic anhydride copolymers/resins.

Whether a single dispersant is used or a combination of dispersants is used, the total amount of dispersant(s) in the primer fusing agent may range from about 10 wt % to about 200 wt % based on the weight of the electromagnetic radiation absorber in the primer fusing agent.

A silane coupling agent may also be added to the primer fusing agent to help bond the organic (e.g., dispersant) and inorganic (e.g., pigment) materials. Examples of suitable silane coupling agents include the SILQUEST® A series manufactured by Momentive.

Whether a single silane coupling agent is used or a combination of silane coupling agents is used, the total amount of silane coupling agent(s) in the primer fusing agent may range from about 0.1 wt % to about 50 wt % based on the weight of the electromagnetic radiation absorber in the primer fusing agent. In an example, the total amount of silane coupling agent(s) in the primer fusing agent ranges from about 1 wt % to about 30 wt % based on the weight of the electromagnetic radiation absorber. In another example, the total amount of silane coupling agent(s) in the primer fusing agent ranges from about 2.5 wt % to about 25 wt % based on the weight of the electromagnetic radiation absorber.

One example of the primer fusing agent includes cesium tungsten oxide (CTO) nanoparticles as the electromagnetic radiation absorber. The CTO nanoparticles have a formula of $Cs_xWO_3$, where $0<x<1$. The cesium tungsten oxide nanoparticles may give the primer fusing agent a light blue color. The strength of the color may depend, at least in part, on the amount of the CTO nanoparticles in the primer fusing agent. When it is desirable to form an outer white layer on the 3D printed polyamide object, less of the CTO nanoparticles may be used in the primer fusing agent 14' in order to achieve the white color. In an example, the CTO nanoparticles may be present in the primer fusing agent in an amount ranging from about 1 wt % to about 20 wt % (based on the total weight of the primer fusing agent).

The average particle size of the CTO nanoparticles may range from about 1 nm to about 40 nm. In some examples, the average particle size of the CTO nanoparticles may range from about 1 nm to about 15 nm or from about 1 nm to about 10 nm. The upper end of the particle size range (e.g., from about 30 nm to about 40 nm) may be less desirable, as these particles may be more difficult to stabilize.

This example of the primer fusing agent may also include a zwitterionic stabilizer. The zwitterionic stabilizer may improve the stabilization of this example of the primer fusing agent. While the zwitterionic stabilizer has an overall neutral charge, at least one area of the molecule has a positive charge (e.g., amino groups) and at least one other area of the molecule has a negative charge. The CTO nanoparticles may have a slight negative charge. The zwitterionic stabilizer molecules may orient around the slightly negative CTO nanoparticles with the positive area of the zwitterionic stabilizer molecules closest to the CTO nanoparticles and the negative area of the zwitterionic stabilizer molecules furthest away from the CTO nanoparticles. Then, the negative charge of the negative area of the zwitterionic stabilizer molecules may repel CTO nanoparticles from each other. The zwitterionic stabilizer molecules may form a protective layer around the CTO nanoparticles, and prevent them from coming into direct contact with each other and/or increase the distance between the particle surfaces (e.g., by a distance ranging from about 1 nm to about 2 nm). Thus, the zwitterionic stabilizer may prevent the CTO nanoparticles from agglomerating and/or settling in the primer fusing agent.

Examples of suitable zwitterionic stabilizers include $C_2$ to $C_8$ betaines, $C_2$ to $C_8$ aminocarboxylic acids having a solubility of at least 10 g in 100 g of water, taurine, and combinations thereof. Examples of the $C_2$ to $C_8$ aminocarboxylic acids include beta-alanine, gamma-aminobutyric acid, glycine, and combinations thereof.

The zwitterionic stabilizer may be present in the primer fusing agent in an amount ranging from about 2 wt % to about 35 wt % (based on the total weight of the primer fusing agent). When the zwitterionic stabilizer is the $C_2$ to $C_8$ betaine, the $C_2$ to $C_8$ betaine may be present in an amount ranging from about 8 wt % to about 35 wt % of the total weight of the primer fusing agent. When the zwitterionic stabilizer is the $C_2$ to $C_8$ aminocarboxylic acid, the $C_2$ to $C_8$ aminocarboxylic acid may be present in an amount ranging from about 2 wt % to about 20 wt % of the total weight of the primer fusing agent. When the zwitterionic stabilizer is taurine, taurine may be present in an amount ranging from about 2 wt % to about 35 wt % of the total weight of the primer fusing agent.

In this example, the weight ratio of the CTO nanoparticles to the zwitterionic stabilizer may range from 1:10 to 10:1; or the weight ratio of the CTO nanoparticles to the zwitterionic stabilizer may be 1:1.

Vehicle for Fusing Agents

Any example of the fusing agent (core or primer fusing agent) includes a liquid vehicle. The fusing agent vehicle, or "FA vehicle," may refer to the liquid in which the electromagnetic radiation absorber is/are dispersed or dissolved to form the respective fusing agent. A wide variety of FA vehicles, including aqueous and non-aqueous vehicles, may be used in the fusing agents. In some examples, the FA vehicle may include water alone or a non-aqueous solvent alone, i.e., with no other components. In other examples, the FA vehicle may include other components, depending, in part, upon the applicator that is to be used to dispense the fusing agent. Examples of other suitable fusing agent components include co-solvent(s), humectant(s), surfactant(s), antimicrobial agent(s), anti-kogation agent(s), and/or chelating agent(s).

Classes of water soluble or water miscible organic co-solvents that may be used in the fusing agents include aliphatic alcohols, aromatic alcohols, diols, glycol ethers, polyglycol ethers, lactams, formamides (substituted and unsubstituted), acetamides (substituted and unsubstituted), glycols, and long chain alcohols. Examples of these co-solvents include primary aliphatic alcohols, secondary aliphatic alcohols, 1,2-alcohols, 1,3-alcohols, 1,5-alcohols, 1,6-hexanediol or other diols (e.g., 1,2-propanediol, 1,5-pentanediol, 2-methyl-1,3-propanediol, etc.), ethylene glycol alkyl ethers, propylene glycol alkyl ethers, higher homologs ($C_6$-$C_{12}$) of polyethylene glycol alkyl ethers, triethylene glycol, tetraethylene glycol, tripropylene glycol methyl ether, N-alkyl caprolactams, unsubstituted caprolactams, 2-pyrrolidone, 1-methyl-2-pyrrolidone, 1-(2-hydroxyethyl)-2-pyrrolidone, and the like. Other examples of organic co-solvents include dimethyl sulfoxide (DMSO), isopropyl alcohol, ethanol, pentanol, acetone, or the like.

The co-solvent(s) may be present in the fusing agent in a total amount ranging from about 1 wt % active to about 20 wt % active based upon the total weight of the fusing agent. In an example, the fusing agent includes from about 2 wt % active to about 15 wt % active, or from about 5 wt % active to about 10 wt % active of the co-solvent(s).

The FA vehicle may also include humectant(s). An example of a suitable humectant is ethoxylated glycerin having the following formula:

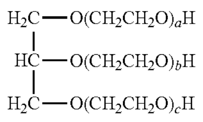

in which the total of a+b+c ranges from about 5 to about 60, or in other examples, from about 20 to about 30. An example of the ethoxylated glycerin is LIPONIC® EG-1 (LEG-1, glycereth-26, a+b+c=26, available from Lipo Chemicals).

In an example, the total amount of the humectant(s) present in the fusing agent ranges from about 3 wt % active to about 10 wt % active, based on the total weight of the fusing agent.

The FA vehicle may also include surfactant(s). Suitable surfactant(s) for the fusing agent include non-ionic, anionic, or cationic surfactants. Some example surfactants include alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, fluorosurfactants, and the like. Some specific examples include a self-emulsifiable, non-ionic wetting agent based on acetylenic diol chemistry (e.g., SURFYNOL® SEF from Evonik Degussa), a non-ionic fluorosurfactant (e.g., CAPSTONE® fluorosurfactants, such as CAPSTONE® FS-35, from Chemours), an ethoxylated low-foam wetting agent (e.g., SURFYNOL® 440 or SURFYNOL® CT-111 from Evonik Degussa), an ethoxylated wetting agent and molecular defoamer (e.g., SURFYNOL® 420 from Evonik Degussa), non-ionic wetting agents and molecular defoamers (e.g., SURFYNOL® 104E from Evonik Degussa), and/or water-soluble, non-ionic surfactants (e.g., TERGITOL™ TMN-6, TERGITOL™ 15-S-7, or TERGITOL™ 15-S-9 (a secondary alcohol ethoxylate) from The Dow Chemical Company or TEGO® Wet 510 (organic surfactant) available from Evonik Degussa). Yet another suitable (anionic) surfactant includes alkyldiphenyloxide disulfonate (e.g., the DOWFAX™ series, such a 2A1, 3B2, 8390, C6L, C10L, and 30599, from The Dow Chemical Company).

Whether a single surfactant is used or a combination of surfactants is used, the total amount of surfactant(s) in the fusing agent may range from about 0.01 wt % active to about 3 wt % active based on the total weight of the fusing agent. In an example, the total amount of surfactant(s) in the fusing agent may be about 1 wt % active based on the total weight of the build material reactive functional agent.

The FA vehicle may also include antimicrobial agent(s). Antimicrobial agents are also known as biocides and/or fungicides. Examples of suitable antimicrobial agents include the NUOSEPT® (Ashland Inc.), UCARCIDE™ or KORDEK™ or ROCIMA™ (The Dow Chemical Company), PROXEL® (Arch Chemicals) series, ACTICIDE® B20 and ACTICIDE® M20 and ACTICIDE® MBL (blends of 2-methyl-4-isothiazolin-3-one (MIT), 1,2-benzisothiazolin-3-one (BIT) and Bronopol) (Thor Chemicals), AXIDE™ (Planet Chemical), NIPACIDE™ (Clariant), blends of 5-chloro-2-methyl-4-isothiazolin-3-one (CIT or CMIT) and MIT under the tradename KATHON™ (The Dow Chemical Company), and combinations thereof.

In an example, the total amount of antimicrobial agent(s) in the fusing agent ranges from about 0.01 wt % active to about 0.05 wt % active (based on the total weight of the fusing agent). In another example, the total amount of antimicrobial agent(s) in the fusing agent is about 0.04 wt % active (based on the total weight of the fusing agent).

The FA vehicle may also include anti-kogation agent(s) that is/are to be jetted using thermal inkjet printing. Kogation refers to the deposit of dried printing liquid (e.g., fusing agent) on a heating element of a thermal inkjet printhead. Anti-kogation agent(s) is/are included to assist in preventing the buildup of kogation.

Examples of suitable anti-kogation agents include oleth-3-phosphate (commercially available as CRODAFOS™ 03A or CRODAFOS™ N-3A) or dextran 500 k. Other suitable examples of the anti-kogation agents include CRODAFOS™ HCE (phosphate-ester from Croda Int.), CRODAFOS® O10A (oleth-10-phosphate from Croda Int.), or DISPERSOGEN® LFH (polymeric dispersing agent with aromatic anchoring groups, acid form, anionic, from Clariant), etc. It is to be understood that any combination of the anti-kogation agents listed may be used.

The anti-kogation agent may be present in the fusing agent in an amount ranging from about 0.1 wt % active to about 1.5 wt % active, based on the total weight of the fusing agent. In an example, the anti-kogation agent is present in an amount of about 0.5 wt % active, based on the total weight of the fusing agent.

Chelating agents (or sequestering agents) may be included in the liquid vehicle of the fusing agent to eliminate the deleterious effects of heavy metal impurities. In an example, the chelating agent is selected from the group consisting of methylglycinediacetic acid, trisodium salt; 4,5-dihydroxy-1,3-benzenedisulfonic acid disodium salt monohydrate; ethylenediaminetetraacetic acid (EDTA); hexamethylenediamine tetra(methylene phosphonic acid), potassium salt; and combinations thereof. Methylglycinediacetic acid, trisodium salt (Na3MGDA) is commercially available as TRILON® M from BASF Corp. 4,5-dihydroxy-1,3-benzenedisulfonic acid disodium salt monohydrate is commercially available as TIRON™ monohydrate. Hexamethylenediamine tetra (methylene phosphonic acid), potassium salt is commercially available as DEQUEST® 2054 from Italmatch Chemicals.

Whether a single chelating agent is used or a combination of chelating agents is used, the total amount of chelating agent(s) in the fusing agent may range from greater than 0 wt % active to about 0.5 wt % active based on the total weight of the fusing agent. In an example, the chelating agent is present in an amount ranging from about 0.05 wt % active to about 0.2 wt % active based on the total weight of fusing agent. In another example, the chelating agent(s) is/are present in the fusing agent in an amount of about 0.05 wt % active (based on the total weight of the fusing agent).

In examples where the FA vehicle is an aqueous-based vehicle, the balance of the fusing agent(s) is water (e.g., deionized water, purified water, etc.), which as described herein, may vary depending upon the other components in the fusing agent(s).

Detailing Agent

In the examples disclosed herein, a detailing agent may be used in the 3D printing method.

The detailing agent may include a surfactant, a co-solvent, and a balance of water. In some examples, the detailing agent consists of these components, and no other components. In some other examples, the detailing agent may further include a colorant. In still some other examples, the detailing agent consists of a colorant, a surfactant, a co-solvent, and a balance of water, with no other components. In yet some other examples, the detailing agent may further include additional components, such as anti-kogation agent(s), antimicrobial agent(s), and/or chelating agent(s) (each of which is described above in reference to the fusing agent).

The surfactant(s) that may be used in the detailing agent include any of the surfactants listed herein in reference to the fusing agent. The total amount of surfactant(s) in the detailing agent may range from about 0.10 wt % active to about 5.00 wt % active with respect to the total weight of the detailing agent.

The co-solvent(s) that may be used in the detailing agent include any of the co-solvents listed above in reference to the fusing agent. The total amount of co-solvent(s) in the detailing agent may range from about 1 wt % active to about 65 wt % active with respect to the total weight of the detailing agent.

In some examples, the detailing agent does not include a colorant. In these examples, the detailing agent may be colorless. As used herein, "colorless," means that the detailing agent is achromatic and does not include a colorant.

When the detailing agent includes the colorant, the colorant may be a dye of any color having substantially no absorbance in a range of 650 nm to 2500 nm. By "substantially no absorbance" it is meant that the dye absorbs no radiation having wavelengths in a range of 650 nm to 2500 nm, or that the dye absorbs less than 10% of radiation having wavelengths in a range of 650 nm to 2500 nm. The dye may also be capable of absorbing radiation with wavelengths of 650 nm or less. As such, the dye absorbs at least some wavelengths within the visible spectrum, but absorbs little or no wavelengths within the near-infrared spectrum. This is in contrast to the active (energy absorbing) material in the fusing agent, which absorbs wavelengths within the near-infrared spectrum. As such, the colorant in the detailing agent will not substantially absorb the fusing radiation, and thus will not initiate melting and fusing (coalescence) of the polyamide build material composition in contact therewith when the build material layer is exposed to the energy.

It may be desirable to add color to the detailing agent when the detailing agent is applied to the edge of a colored part. Color in the detailing agent may be desirable when used at a part edge because some of the colorant may become embedded in the polyamide build material composition that fuses/coalesces at the edge. As such, in some examples, the dye in the detailing agent may be selected so that its color matches the color of the active material in the fusing agent. As examples, the dye may be any azo dye having sodium or potassium counter ion(s) or any diazo (i.e., double azo) dye having sodium or potassium counter ion(s), where the color of azo or dye azo dye matches the color of the fusing agent.

In an example, the dye is a black dye. Some examples of the black dye include azo dyes having sodium or potassium counter ion(s) and diazo (i.e., double azo) dyes having sodium or potassium counter ion(s). Examples of azo and diazo dyes may include tetrasodium (6Z)-4-acetamido-5-oxo-6-[[7-sulfonato-4-(4-sulfonatophenyl)azo-1-naphthyl]hydrazono]naphthalene-1,7-disulfonate with a chemical structure of:

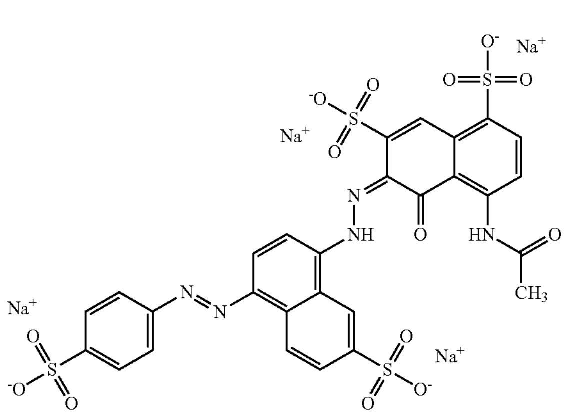

(commercially available as Food Black 1); tetrasodium 6-amino-4-hydroxy-3-[[7-sulfonato-4-[(4-sulfonatophenyl)azo]-1-naphthyl]azo]naphthalene-2,7-disulfonate with a chemical structure of:

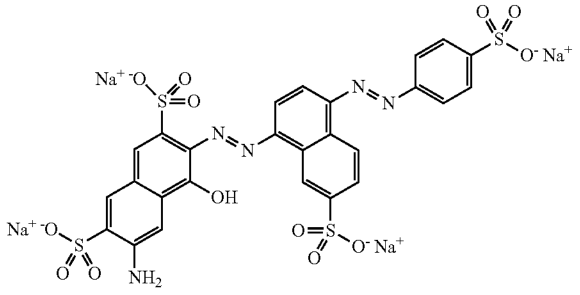

(commercially available as Food Black 2); tetrasodium (6E)-4-amino-5-oxo-3-[[4-(2-sulfonatooxyethylsulfonyl) phenyl]diazenyl]-6-[[4-(2-sulfonatooxyethylsulfonyl)phenyl]hydrazinylidene]naphthalene-2,7-disulfonate with a chemical structure of:

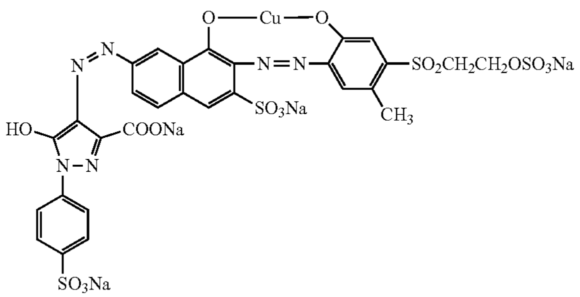

(commercially available as Reactive Black 31); tetrasodium (6E)-4-amino-5-oxo-3-[[4-(2-sulfonatooxyethylsulfonyl) phenyl]diazenyl]-6-[[4-(2-sulfonatooxyethylsulfonyl)phenyl]hydrazinylidene]naphthalene-2,7-disulfonate with a chemical structure of:

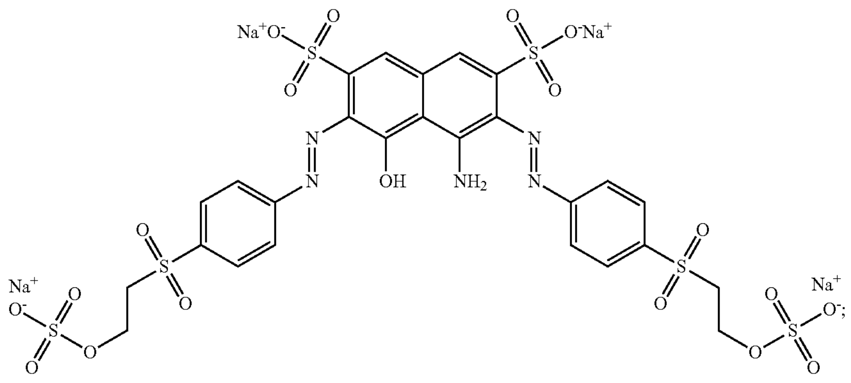

and combinations thereof. Some other commercially available examples of the dye used in the detailing agent include multipurpose black azo-dye based liquids, such as PRO-JET® Fast Black 1 (made available by Fujifilm Holdings), and black azo-dye based liquids with enhanced water fastness, such as PRO-JET® Fast Black 2 (made available by Fujifilm Holdings).

In some instances, in addition to the black dye, the colorant in the detailing agent may further include another dye. In an example, the other dye may be a cyan dye that is used in combination with any of the dyes disclosed herein. The other dye may also have substantially no absorbance above 650 nm. The other dye may be any colored dye that contributes to improving the hue and color uniformity of the final 3D printed polyamide object.

Some examples of the other dye include a salt, such as a sodium salt, an ammonium salt, or a potassium salt. Some specific examples include ethyl-[4-[[4-[ethyl-[(3-sulfophenyl) methyl] amino] phenyl]-(2-sulfophenyl) ethylidene]-1-cyclohexa-2,5-dienylidene]-[(3-sulfophenyl) methyl] azanium with a chemical structure of:

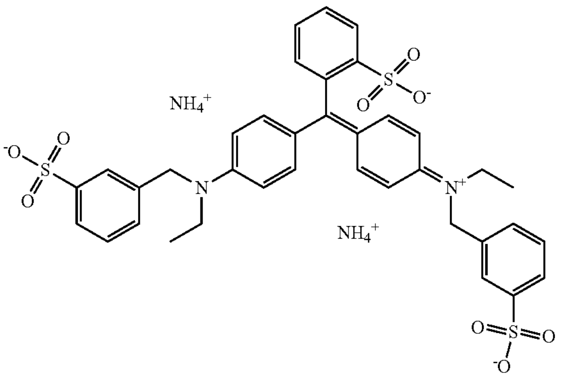

(commercially available as Acid Blue 9, where the counter ion may alternatively be sodium counter ions or potassium counter ions); sodium 4-[(E)-{4-[benzyl(ethyl)amino]phenyl}{(4E)-4-[benzyl(ethyl)iminio]cyclohexa-2,5-dien-1-ylidene}methyl]benzene-1,3-disulfonate with a chemical structure of:

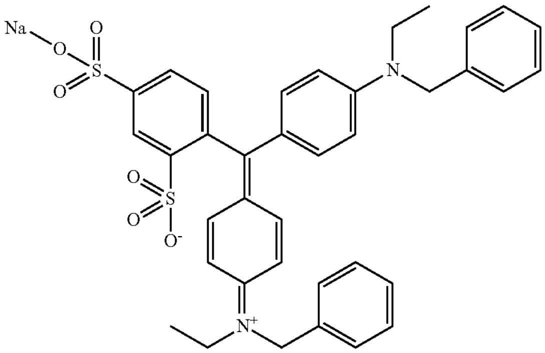

(commercially available as Acid Blue 7); and a phthalocyanine with a chemical structure of:

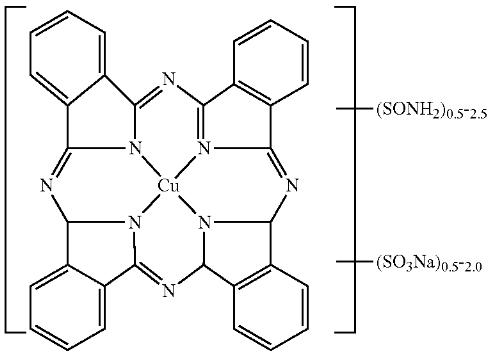

(commercially available as Direct Blue 199); and combinations thereof.

In an example of the detailing agent, the dye may be present in an amount ranging from about 1 wt % active to about 3 wt % active based on the total weight of the detailing agent. In another example of the detailing agent including a combination of dyes, one dye (e.g., the black dye) is present in an amount ranging from about 1.50 wt % active to about 1.75 wt % active based on the total weight of the detailing agent, and the other dye (e.g., the cyan dye) is present in an amount ranging from about 0.25 wt % active to about 0.50 wt % active based on the total weight of the detailing agent.

The balance of the detailing agent is water. As such, the amount of water may vary depending upon the amounts of the other components that are included.

Coloring Agent

In the examples disclosed herein, a coloring agent may be used in the 3D printing method.

The coloring agent may include a colorant, a co-solvent, and a balance of water. In some examples, the coloring agent consists of these components, and no other components.

In some other examples, the coloring agent may further include a binder and/or a buffer. The binder may be an acrylic latex binder, which may be a copolymer of any two or more of styrene, acrylic acid, methacrylic acid, methyl methacrylate, ethyl methacrylate, and butyl methacrylate. The buffer may be TRIS (tris(hydroxymethyl)aminomethane or TRIZMA®), TRIS or TRIZMA® hydrochloride, bis-tris propane, TES (2-[(2-Hydroxy-1,1-bis(hydroxymethyl)ethyl)amino]ethanesulfonic acid), MES (2-ethanesulfonic acid), MOPS (3-(N-morpholino)propanesulfonic acid), HEPES (4-(2-hydroxyethyl)-1-piperazineethanesulfonic acid), DIPSO (3-(N,N-Bis[2-hydroxyethyl]amino)-2-hydroxypropanesulfonic acid), Tricine (N-[tris(hydroxymethyl)methyl]glycine), HEPPSO (β-Hydroxy-4-(2-hydroxyethyl)-1-piperazinepropanesulfonic acid monohydrate), POPSO (Piperazine-1,4-bis(2-hydroxypropanesulfonic acid) dihydrate), EPPS (4-(2-Hydroxyethyl)-1-piperazinepropanesulfonic acid, 4-(2-Hydroxyethyl)piperazine-1-propanesulfonic acid), TEA (triethanolamine buffer solution), Gly-Gly (Diglycine), bicine (N,N-Bis(2-hydroxyethyl)glycine), HEPBS (N-(2-Hydroxyethyl)piperazine-N'-(4-butanesulfonic acid)), TAPS ([tris(hydroxymethyl)methylamino]propanesulfonic acid), AMPD (2-amino-2-methyl-1,3-propanediol), TABS (N-tris(Hydroxymethyl) methyl-4-aminobutanesulfonic acid), or the like.

In still other examples, the coloring agent may further include additional components, such as dispersant(s), humectant(s), surfactant(s), anti-kogation agent(s), antimicrobial agent(s), and/or chelating agent(s) (each of which is described herein in reference to the fusing agent).

The coloring agent may be a black agent, a cyan agent, a magenta agent, or a yellow agent. As such, the colorant may be a black colorant, a cyan colorant, a magenta colorant, a yellow colorant, or a combination of colorants that together achieve a black, cyan, magenta, or yellow color.

In some instances, the colorant of the coloring agent may be transparent to infrared wavelengths. In other instances, the colorant of the coloring agent may not be completely transparent to infrared wavelengths, but does not absorb enough radiation to sufficiently heat the polyamide build material composition in contact therewith. In an example, the colorant absorbs less than 10% of radiation having wavelengths in a range of 650 nm to 2500 nm. In another example, the colorant absorbs less than 20% of radiation having wavelengths in a range of 650 nm to 4000 nm.

The colorant of the coloring agent is also capable of absorbing radiation with wavelengths of 650 nm or less. As such, the colorant absorbs at least some wavelengths within the visible spectrum, but absorbs little or no wavelengths within the near-infrared spectrum. This is in contrast to at least some examples of the electromagnetic radiation absorber in the fusing agent, which absorbs wavelengths within the near-infrared spectrum and/or the infrared spectrum. As such, the colorant in the coloring agent will not substantially absorb the fusing radiation, and thus will not initiate coalescing/fusing of the polyamide build material composition in contact therewith when the polyamide build material composition is exposed to energy.

Examples of IR transparent colorants include acid yellow 23 (AY 23), AY17, acid red 52 (AR 52), AR 289, and reactive red 180 (RR 180). Examples of colorants that absorb some visible wavelengths and some IR wavelengths include cyan colorants, such as direct blue 199 (DB 199) and pigment blue 15:3 (PB 15:3).

In other examples, the colorant may be any azo dye having sodium or potassium counter ion(s) or any diazo (i.e., double azo) dye having sodium or potassium counter ion(s), such as those described herein for the detailing agent 16.

An example of the pigment based coloring agent may include from about 1 wt % active to about 10 wt % active of pigment(s), from about 10 wt % active to about 30 wt % active of co-solvent(s), from about 1 wt % active to about 10 wt % active of dispersant(s), from about 0.1 wt % active to about 5 wt % active of binder(s), from 0.01 wt % active to about 1 wt % active of anti-kogation agent(s), from about 0.05 wt % active to about 0.1 wt % active antimicrobial agent(s), and a balance of water. An example of the dye based coloring agent may include from about 1 wt % active to about 7 wt % active of dye(s), from about 10 wt % active to about 30 wt % active of co-solvent(s), from about 1 wt % active to about 7 wt % active of dispersant(s), from about 0.05 wt % active to about 0.1 wt % active antimicrobial agent(s), from 0.05 wt % active to about 0.1 wt % active of chelating agent(s), from about 0.005 wt % active to about 0.2 wt % active of buffer(s), and a balance of water.

Some examples of the coloring agent include a set of cyan, magenta, and yellow agents, such as C1893A (cyan), C1984A (magenta), and C1985A (yellow); or C4801A (cyan), C4802A (magenta), and C4803A (yellow); all of which are available from HP Inc. Other commercially available coloring agents 18 include C9384A (printhead HP 72), C9383A (printhead HP 72), C4901A (printhead HP 940), and C4900A (printhead HP 940).

3D Printing Methods

Different examples of the 3D printing method are shown and described in reference to FIG. 3 through FIG. 6.

Prior to execution of any examples of the method, it is to be understood that a controller may access data stored in a data store pertaining to a 3D part/object that is to be printed. For example, the controller may determine the number of layers of the polyamide build material composition that are to be formed, the locations at which any of the agents is/are to be deposited on each of the respective layers, etc.

Printing with one Fusing Agent

Figure 3:
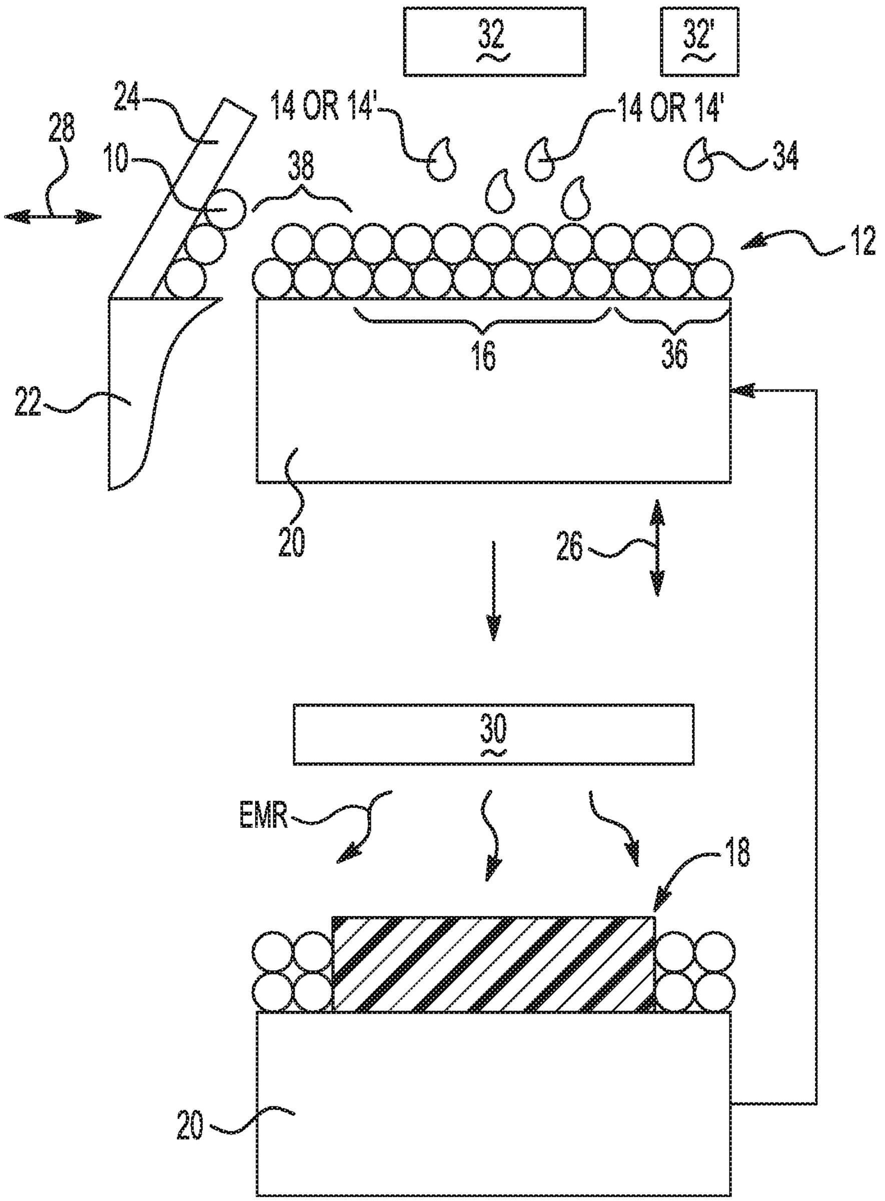
FIG. 3 is a schematic illustration of one example of the 3D printing method.

Referring now to FIG. 3, an example a 3D printing method which utilizes one of the fusing agents is schematically depicted.

The method shown in FIG. 3 includes applying a polyamide build material composition 10 to form a build material layer 12; based on a 3D object model, selectively applying a fusing agent 14 or 14' onto the build material layer, thereby forming a patterned portion 16; and exposing the build material layer 12 to electromagnetic radiation EMR to selectively coalesce the patterned portion 16 and form a 3D printed object layer 18.

In FIG. 3, the layer 12 of the polyamide build material composition 10 is applied on a build area platform 20. A printing system may be used to apply the polyamide build material composition 10. The printing system may include the build area platform 20, a build material supply 22 containing the build material composition 10, and a build material distributor 24.

The build area platform 20 receives the polyamide build material composition 10 from the build material supply 22. The build area platform 20 may be moved in the directions as denoted by the arrow 26, e.g., along the z-axis, so that the build material composition 10 may be delivered to the build area platform 20 or to a previously formed layer. In an example, when the polyamide build material composition 10 is to be delivered, the build area platform 20 may be programmed to advance (e.g., downward) enough so that the build material distributor 24 can push the build material composition 10 onto the build area platform 20 to form a substantially uniform layer 12 of the build material composition 10 thereon. The build area platform 20 may also be returned to its original position, for example, when a new part is to be built.

The build material supply 22 may be a container, bed, or other surface that is to position the build material composition 10 between the build material distributor 24 and the build area platform 20. The build material supply 22 may include heaters so that the build material composition 10 is heated to a supply temperature ranging from about 25° C. to about 150° C. In these examples, the supply temperature may depend, in part, on the build material composition 10 used and/or the 3D printer used. As such, the range provided is one example, and higher or lower temperatures may be used.

The build material distributor 24 may be moved in the directions as denoted by the arrow 28, e.g., along the y-axis, over the build material supply 22 and across the build area platform 20 to spread the layer 12 of the polyamide build material composition 10 over the build area platform 20. The build material distributor 24 may also be returned to a position adjacent to the build material supply 22 following the spreading of the polyamide build material composition 10. The build material distributor 24 may be a blade (e.g., a doctor blade), a roller, a combination of a roller and a blade, and/or any other device capable of spreading the build material composition 10 over the build area platform 20. For instance, the build material distributor 24 may be a counter-rotating roller. In some examples, the build material supply 22 or a portion of the build material supply 22 may translate along with the build material distributor 24 such that polyamide build material composition 10 is delivered continuously to the build area platform 20 rather than being supplied from a single location at the side of the printing system as depicted in FIG. 3.

The build material supply 22 may supply the polyamide build material composition 10 into a position so that it is ready to be spread onto the build area platform 20. The build material distributor 24 may spread the supplied build material composition 10 onto the build area platform 20. The controller (not shown) may process "control build material supply" data, and in response, control the build material supply 22 to appropriately position the particles of the build material composition 10, and may process "control spreader" data, and in response, control the build material distributor 24 to spread the polyamide build material composition 10 over the build area platform 20 to form the layer 12. In FIG. 3, one build material layer 12 has been formed.

The layer 12 has a substantially uniform thickness across the build area platform 20. In an example, the build material layer 12 has a thickness ranging from about 50 μm to about 120 μm. In another example, the thickness of the build material layer 12 ranges from about 30 μm to about 300 μm. It is to be understood that thinner or thicker layers may also be used. For example, the thickness of the build material layer 12 may range from about 20 μm to about 500 μm. The layer thickness may be about 2× (i.e., 2 times) the average particle size (e.g., diameter) of the polyamide particles at a minimum for finer part definition. In some examples, the layer thickness may be about 1.2× the average diameter of the polyamide particles in the polyamide build material composition 10.

After the polyamide build material composition 10 has been applied, and prior to further processing, the build material layer 12 may be exposed to heating. In an example, the heating temperature may be below the melting point or melting range of the polyamide material in the build material composition 10. As examples, the pre-heating temperature may range from about 5° C. to about 50° C. below the melting point or the lowest temperature of the melting range of the polyamide material. In an example, the pre-heating temperature ranges from about 50° C. to about 205° C. In still another example, the pre-heating temperature ranges from about 100° C. to about 190° C. It is to be understood that the pre-heating temperature may depend, in part, on the build material composition 10 used. As such, the ranges provided are some examples, and higher or lower temperatures may be used.

Pre-heating the layer 12 may be accomplished by using any suitable heat source that exposes all of the polyamide build material composition 10 in the layer 12 to the heat. Examples of the heat source include a thermal heat source (e.g., a heater (not shown) integrated into the build area platform 20 (which may include sidewalls)) or a radiation source 30.

After the layer 12 is formed, and in some instances is pre-heated, the fusing agent 14 or 14' is selectively applied on at least some of the polyamide build material composition 10 in the layer 12 to form a patterned portion 36.

To form a layer 18 of a 3D printed polyamide object, at least a portion (e.g., patterned portion 16) of the layer 12 of the build material composition 10 is patterned with the fusing agent 14 or 14'. Either fusing agent 14 or 14' may be used. When it is desirable to form a white, colored, or slightly tinted object layer 18, the primer fusing agent 14' may be used to pattern the polyamide build material composition 10. The primer fusing agent 14' is clear or slightly tinted, and thus the resulting 3D printed object layer 18 may appear white or the color of the build material composition 10. When it is desirable to form a darker color or black object layer 18, the core fusing agent 14 may be used. The core fusing agent 14 is dark or black, and thus the resulting 3D printed object layer 18 may appear grey, black or another dark color. In other examples of the method (e.g., method shown in FIG. 4) the two fusing agents 14 and 14' may be used to pattern different portions of a single build material layer 12, which will be described further in reference to FIG. 4. Color may also be added by using the coloring agent (not shown), which will also be described further in reference to FIG. 6.

The volume of the fusing agent 14 or 14' that is applied per unit of the polyamide build material composition 10 in the patterned portion 16 may be sufficient to absorb and convert enough electromagnetic radiation so that the polyamide build material composition 10 in the patterned portion 16 will coalesce/fuse. The volume of the fusing agent 14 or 14' that is applied per unit of the polyamide build material composition 10 may depend, at least in part, on the electromagnetic radiation absorber used, the electromagnetic radiation absorber loading in the fusing agent 14 or 14', and the polyamide material in the build material composition 10.

The fusing agent 14 or 14' may be dispensed from an applicator 32. The applicator 32 may include a thermal inkjet printhead, a piezoelectric printhead, a continuous inkjet printhead, etc., and the selective application of the fusing agent 1214 or 14' may be accomplished by thermal inkjet printing, piezo electric inkjet printing, continuous inkjet printing, etc. The controller may process data, and in response, control the applicator 32 to deposit the fusing agent 14 or 14' onto the predetermined portion(s) 16 of the build material composition 10.

It is to be understood that the selective application of the fusing agent 14 or 14' may be accomplished in a single printing pass or in multiple printing passes. In some examples, the fusing agent 14 or 14' is selectively applied in a single printing pass. In some other examples, the fusing agent 14 or 14' is selectively applied in multiple printing passes. In one of these examples, the number of printing passes ranging from 2 to 4. In still other examples, 2 or 4 printing passes are used. It may be desirable to apply the fusing agent 14 or 14' in multiple printing passes to increase the amount, e.g., of the energy absorber that is applied to the build material composition 10, to avoid liquid splashing, to avoid displacement of the build material composition 10, etc.

In the example shown in FIG. 3, the detailing agent 34 is also selectively applied to the portion(s) 36 of the layer 12. The portion(s) 36 are not patterned with the fusing agent 14 or 14' and thus are not to become part of the final 3D printed object layer 18. Thermal energy generated during radiation exposure may propagate into the surrounding portion(s) 36 that do not have the fusing agent 14 or 14' applied thereto. The propagation of thermal energy may be inhibited, and thus the coalescence of the non-patterned build material portion(s) 36 may be prevented, when the detailing agent 34 is applied to these portion(s) 36.

The detailing agent 34 may also be dispensed from an applicator 32'. The applicator 32' may include any of the inkjet printheads set forth herein. It is to be understood that the applicators 32, 32' may be separate applicators or may be a single applicator with several individual cartridges for dispensing the respective agents 14 or 14' and 34. The detailing agent 34 may also be selectively applied in a single printing pass or in multiple printing passes.

After the agents 14 or 14' and 34 are selectively applied in the specific portion(s) 16 and 36 of the layer 12, the entire layer 12 of the polyamide build material composition 10 is exposed to electromagnetic radiation (shown as EMR in FIG. 3).

The electromagnetic radiation is emitted from the radiation source 30. The length of time the electromagnetic radiation is applied for, or energy exposure time, may be dependent, for example, on one or more of: characteristics of the radiation source 30; characteristics of the polyamide build material composition 10; and/or characteristics of the fusing agent 14 or 14'.

It is to be understood that the electromagnetic radiation exposure may be accomplished in a single radiation event or in multiple radiation events. In an example, the exposing of the polyamide build material composition 10 is accomplished in multiple radiation events. In a specific example, the number of radiation events ranges from 3 to 8. In still another specific example, the exposure of the polyamide build material composition 10 to electromagnetic radiation may be accomplished in 3 radiation events. It may be desirable to expose the polyamide build material composition 10 to electromagnetic radiation in multiple radiation events to counteract a cooling effect that may be brought on by the amount of the agents 14 or 14' and 34 that is applied to the build material layer 12. Additionally, it may be desirable to expose the polyamide build material composition 10 to electromagnetic radiation in multiple radiation events to sufficiently elevate the temperature of the build material composition 10 in the portion(s) 16, 36, without over heating the build material composition 10 in the non-patterned portion(s) 36.

The fusing agent 14 or 14' enhances the absorption of the radiation, converts the absorbed radiation to thermal energy, and promotes the transfer of the thermal heat to the build material composition 10 in contact therewith. In an example, the fusing agent 14 or 14' sufficiently elevates the temperature of the build material composition 10 in the portion 16 to a temperature above the melting point or within the melting range of the polyamide material, allowing coalescing/fusing (e.g., thermal merging, melting, binding, etc.) of the build material composition 10 to take place. The application of the electromagnetic radiation forms the 3D printed object layer 18.

In some examples, the electromagnetic radiation has a wavelength ranging from 800 nm to 4000 nm, or from 800 nm to 1400 nm, or from 800 nm to 1200 nm. Radiation having wavelengths within the provided ranges may be absorbed (e.g., 80% or more of the applied radiation is absorbed) by the fusing agent 14 or 14' and may heat the polyamide build material composition 10 in contact therewith, and may not be substantially absorbed (e.g., 25% or less of the applied radiation is absorbed) by the non-patterned build material composition 10 in portion(s) 36.

After the 3D printed object layer 18 is formed, additional layer(s) may be formed thereon to create an example of the 3D printed polyamide object. To form the next layer, additional polyamide build material composition 10 may be applied on the layer 18. The fusing agent 14 or 14' is then selectively applied on at least a portion of the additional build material composition 10, according to the 3D object model. The detailing agent 34 may be applied in any area of the additional build material composition 10 where coalescence is not desirable. After the agent(s) 14 or 14' and 34 is/are applied, the entire layer of the additional build material composition 10 is exposed to electromagnetic radiation in the manner described herein. The application of additional polyamide build material composition 10, the selective application of the agent(s) 14 or 14' and 34, and the electromagnetic radiation exposure may be repeated a predetermined number of cycles to form the final 3D printed polyamide object in accordance with the 3D object model.

Printing With Both Fusing Agents

Figure 4:
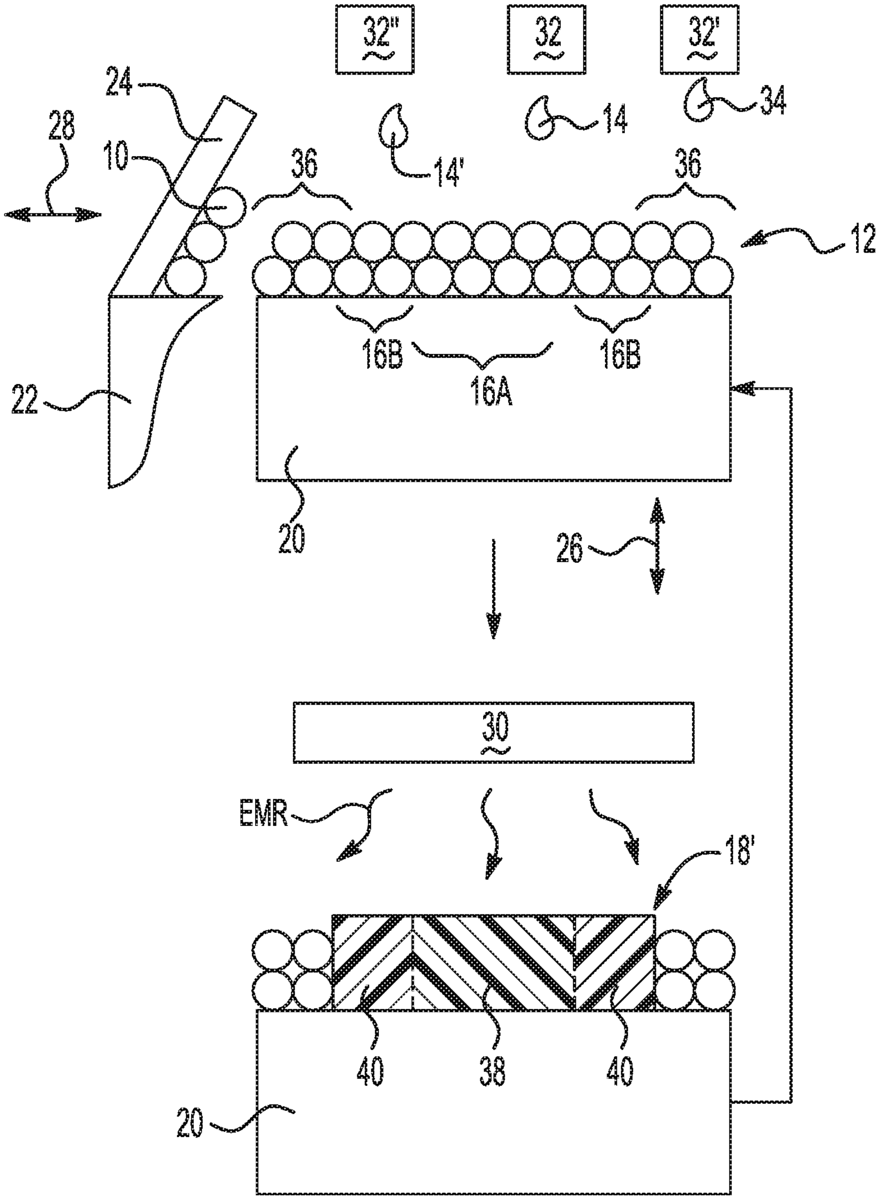
FIG. 4 is a schematic illustration of another example of the 3D printing method.

Referring now to FIG. 4, an example of the 3D printing method which both of the fusing agents 14 and 14' is depicted.

The method shown in FIG. 4 includes applying a polyamide build material composition 10 to form a build material layer 12; based on a 3D object model, selectively applying a core fusing agent 14 onto the build material layer 12, thereby forming a first patterned portion 16A; based on the 3D object model, selectively applying a primer fusing agent 14' onto the build material layer 12, thereby forming a second patterned portion 16B adjacent to the first patterned portion 16A; and exposing the build material layer 12 to electromagnetic radiation EMR to selectively coalesce the patterned portions 16A and 16B and form a 3D printed object layer 18'.

In FIG. 4, one layer 12 of the polyamide build material composition 10 is applied on the build area platform 20 as described in reference to FIG. 3. After the polyamide build material composition 10 has been applied, and prior to further processing, the build material layer 12 may be exposed to pre-heating as described in reference to FIG. 3.

In this example of the 3D printing method, the core fusing agent 14 is selectively applied on at least some of the polyamide build material composition 10 in the layer 12 to form a first patterned portion 16A; and the primer fusing agent(s) 14' is selectively applied on at least some of the polyamide build material composition 10 in the layer 12 to form second patterned portion(s) 16B that are adjacent to the first patterned portion(s) 16A. In one example, the first patterned portion 16A (patterned with the core fusing agent 14) may be located at an interior portion of the build material layer 12 to impart mechanical strength, and the second patterned portion 16B (patterned with the primer fusing agent 14') may be located at an exterior portion of the build material layer 12 to mask the color of the first patterned portion 16A.

The volume of the core fusing agent 14 that is applied per unit of the polyamide build material composition 10 in the first patterned portion 16A may be sufficient to absorb and convert enough electromagnetic radiation so that the build material composition 10 in the patterned portion 16A will coalesce/fuse.

The volume of the primer fusing agent 14' that is applied per unit of the polyamide build material composition 10 in the second patterned portion 16B may be sufficient to absorb and convert enough electromagnetic radiation so that the polyamide build material composition 10 in the second patterned portion 16B will coalesce/fuse.

In the example shown in FIG. 4, the detailing agent 34 is also selectively applied to the portion(s) 36 of the layer 12. The portion(s) 36 are not patterned with the fusing agent 14 or 14' and thus are not to become part of the final 3D printed object layer 18'.

After the agents 14, 14', and 34 are selectively applied in the specific portion(s) 16A, 16B, and 36 of the layer 12, the entire layer 12 of the build material composition 10 is exposed to electromagnetic radiation (shown as EMR in FIG. 4). Radiation exposure may be accomplished as described in reference to FIG. 3.

In this example, the respective fusing agents 14 and 14' enhance the absorption of the radiation, convert the absorbed radiation to thermal energy, and promote the transfer of the thermal heat to the build material composition 10 in contact therewith. In an example, the fusing agents 14 and 14' sufficiently elevate the temperature of the build material composition 10 in the respective portions 16A, 16B to a temperature above the melting point or within the melting range of the polyamide material, allowing coalescing/fusing (e.g., thermal merging, melting, binding, etc.) of the polyamide build material composition 10 to take place. The application of the electromagnetic radiation forms the 3D printed object layer 18', which, in this example, includes a core portion 38 and primer portions 40 at opposed ends of the core portion 38.

FIG. 4 illustrates one example of how the core fusing agent 14 and the primer fusing agent 14' may be used together to pattern a single build material layer 12.

Figure 5:
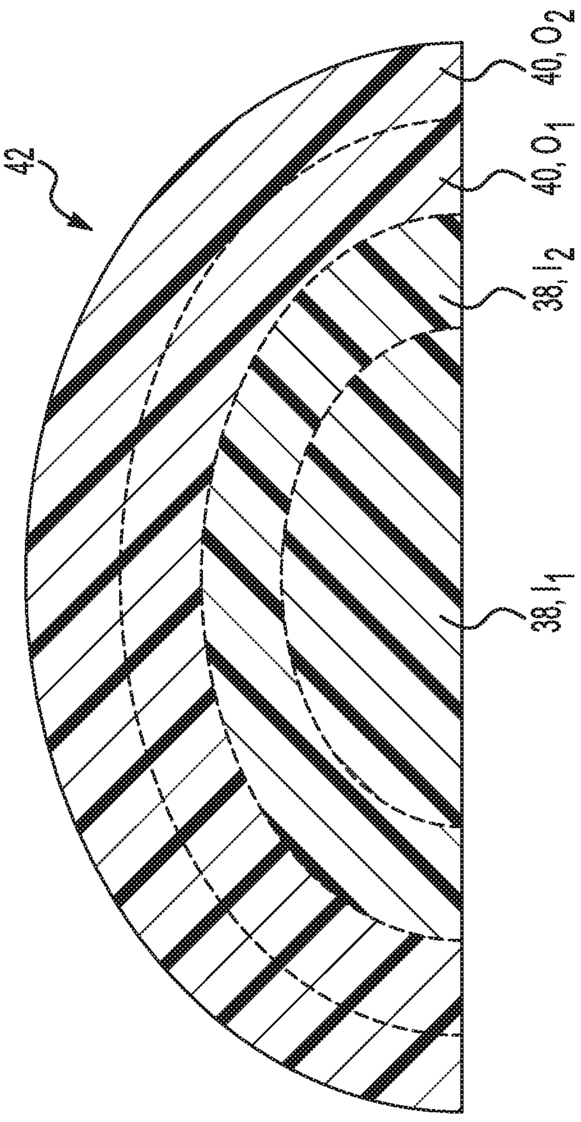
FIG. 5 is a cross-sectional view of an example 3D printed object.

FIG. 5 illustrates another example of how the core fusing agent 14 and the primer fusing agent 14' may be used to pattern several build material layers to form an example 3D printed polyamide object 42. In this example, the example 3D printed polyamide object 42 includes a predetermined number core portions 38, and a predetermined number of primer portions 40. To form this example of the 3D printed polyamide object 42, the core fusing agent 14 would be applied on multiple layers of the polyamide build material composition 10 to pattern and ultimately form the inner core portions 38, $I_1$ and 38, $I_2$ of the 3D printed object 42, and the primer fusing agent 14' would be applied on multiple layers of the polyamide build material composition 10 to pattern and ultimately form the outermost primer portions 40, $O_1$ and 40, $O_2$ of the 3D printed polyamide object 42. After each build material layer 12 is patterned with the agent(s) 14, 14', electromagnetic radiation may be applied to solidify the respective patterned build material layers.

Figure 6:
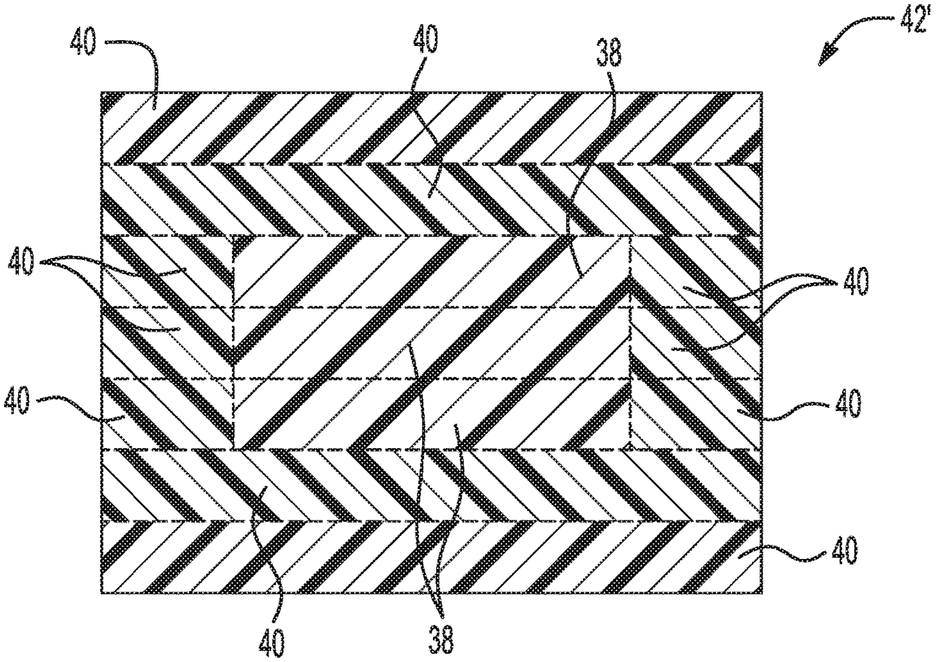
FIG. 6 is a cross-sectional view of another example 3D printed object.

FIG. 6 illustrates another example of how the core fusing agent 14 and the primer fusing agent 14' may be used to pattern several build material layers to form an example 3D printed polyamide object 42'. In this example, the core fusing agent 14 is utilized to form the core (e.g., the center or inner-most portion) of the 3D printed polyamide object 42', and the primer fusing agent 14' is used to form the outermost layers of the 3D printed polyamide object 42'. The core fusing agent 14 can impart strength to the core of the 3D printed polyamide object 42', while the primer fusing agent 14' enables white or a color to be exhibited at the exterior of the 3D printed polyamide object 42'.

To form this example of the 3D printed polyamide object 42', the outermost build material layer(s) and the outermost edges of the middle build material layers would be patterned with the primer fusing agent 14' to form primer portions 40 of the 3D printed polyamide object 42'. The innermost portions of the middle build material layers would be patterned with the core fusing agent 14 to form the core portions 38 of the 3D printed polyamide object 42'. In this example, any number of core portions 38 may be formed, and any number of primer portions 40 may be formed.

In any of the example 3D printing methods, the coloring agent (not shown) may also be applied with the primer fusing agent 14' to generate color at the exterior surfaces of the 3D printed object, such as object 42 or object 42'. For example, the coloring agent may be applied with the primer fusing agent 14' on the portions of the build material layers that form the primer portions 40. Since the primer fusing agent 14' is clear or slightly tinted and the polyamide build material composition 12 is white or off-white, the color of the coloring agent will be the color of the resulting primer portions 40. The colorant of the coloring agent becomes embedded throughout the coalesced/fused build material composition of the primer portions 40.

When core and primer portions 38, 40 are formed and the coloring agent is used, it is to be understood that some of the primer portions 40 directly adjacent to the core portions 40 may be left uncolored. In this example, the uncolored primer portions 40 are white or slightly tinted, and may function as intermediate layers that help to form a mask over the black (or dark colored) core layers 38. The presence of uncolored primer portions 40 between core portions 38 and primer portions 40 that are colored with the coloring agent may help to optically isolate the core layers 38.

While several variations of the 3D printed polyamide objects 42, 42' and the combinations of fusing agents 14, 14' have been described, it is to be understood that the fusing agents 14, 14' may be used to form any desirable 3D printed object.

Additionally, in the examples disclosed herein, the 3D printed polyamide object 42, 42' may be printed in any orientation. For example, 3D printed polyamide object 42, 42' can be printed from bottom to top, top to bottom, on its side, at an angle, or any other orientation. The orientation of the 3D printed polyamide object 42, 42' can also be formed in any orientation relative to the layering of the polyamide build material composition 10. For example, the 3D printed polyamide object 42, 42' can be formed in an inverted orientation or on its side relative to the build layering within the polyamide build material composition 10. The orientation of the build within the polyamide build material composition 10 can be selected in advance or even by the user at the time of printing, for example.

Post-Process Finishing Technique

Figure 7:
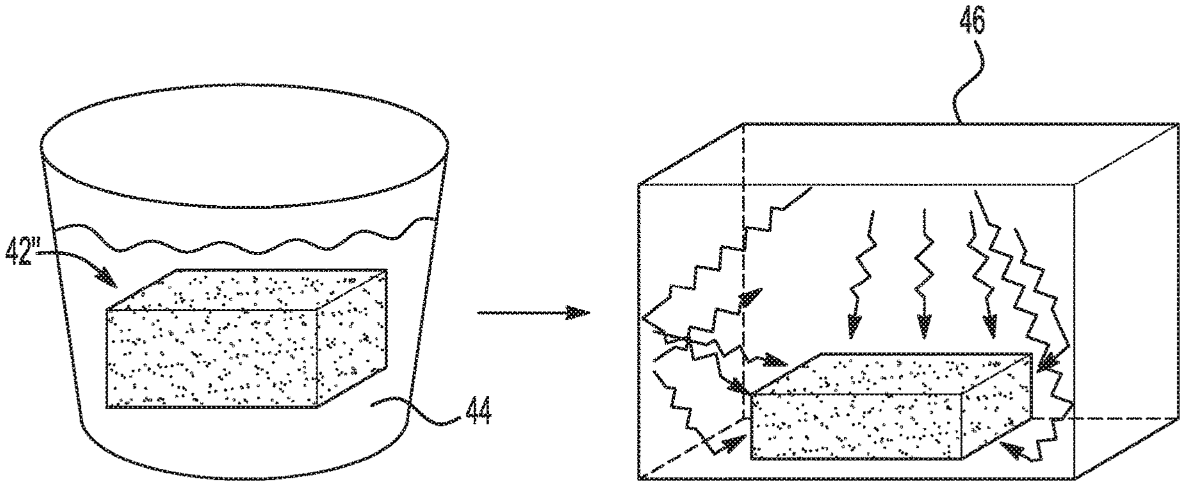
FIG. 7 is a schematic illustration of an example of the surface treating method.

Following any example of 3D printing as disclosed herein, the 3D printed polyamide object may be exposed to the post-process finishing technique disclosed herein. As shown in FIG. 1 and in FIG. 2 at reference numerals 204 and 206, the post-process finishing technique is a surface treatment which includes exposing the 3D printed polyamide object to benzyl alcohol, and exposing the three-dimensionally printed polyamide object to microwave irradiation after benzyl alcohol exposure. FIG. 7 schematically illustrates one example of the surface treatment method.

Prior to the surface treatment method, the 3D printed polyamide object (shown at 42" in FIG. 7) may be generated using any example of the 3D printing method (e.g., with one or both fusing agents 14 and/or 14'), and may be removed from the build area platform 20. Excess (non-coalesced) polyamide build material composition 10 may be removed from the 3D printed polyamide object 42".

The 3D printed polyamide object 42" may then be exposed to the benzyl alcohol 44. Benzyl alcohol is an aromatic alcohol with the formula $C_6HSCH_2OH$. In one example, the benzyl alcohol is anhydrous (99.8%) benzyl alcohol. In another example, the benzyl alcohol is 99.0% benzyl alcohol.

Exposure of the 3D printed polyamide object 42" to the benzyl alcohol 44 may involve any process that treats the surface of the 3D printed polyamide object 42" with the benzyl alcohol 44. Suitable methods may involve soaking the 3D printed polyamide object 42" in the benzyl alcohol 44, spraying the 3D printed polyamide object 42" with the benzyl alcohol 44, brushing the benzyl alcohol 44 on the 3D printed polyamide object 42", or the like. These processes expose the 3D printed polyamide object 42" to a relatively gentle solvent that can coat the exterior surface of the 3D printed polyamide object 42" and also penetrate into pores at exterior surface of the 3D printed polyamide object 42".

In the example shown in FIG. 7, the exposure to benzyl alcohol involves soaking the 3D printed polyamide object 42" in the benzyl alcohol 44. In this example, the 3D printed polyamide object 42" may be dipped into the benzyl alcohol 44, and allowed to soak in the benzyl alcohol 44. As shown in FIG. 7, the entire 3D printed polyamide object 42" can be immersed in the benzyl alcohol 44.

When exposing the 3D printed polyamide object 42" to the benzyl alcohol involves soaking, the soaking may be performed for a time period ranging from about 30 minutes to about 100 hours. In one example, soaking is performed for a time period ranging from about 1 hour to about 50 hours. In another example, soaking is performed for a time period ranging from about 1 hour to about 25 hours. In still other examples, soaking is performed for a time period ranging from about 2 hours to about 10 hours or from about 3 hours to about 4 hours.

Any of the benzyl alcohol exposure techniques disclosed herein may be performed at room temperature, e.g., at a temperature ranging from about 18° C. to about 27° C. For example, soaking may be performed at room temperature, e.g., at a temperature ranging from about 18° C. to about 27° C.

In the example shown in FIG. 7, the soaked 3D printed polyamide object 42" may be removed from the benzyl alcohol 44. In other examples, spraying or brushing may be stopped after a predetermined time and/or after a predetermined amount of benzyl alcohol has been applied.

In some examples, after the 3D printed polyamide object 42" has been exposed to the benzyl alcohol 44, the 3D printed polyamide object 42" may be immediately transferred to a microwave oven 46 for irradiation exposure. In these instances, the wet 3D printed polyamide object 42" is exposed to microwave irradiation.

In other examples, the surface treatment method may further include at least partially drying the three-dimensionally printed polyamide object 42" after exposing the three-dimensionally printed polyamide object 42" to the benzyl alcohol and prior to exposing the three-dimensionally printed polyamide object 42" to the microwave irradiation. At least partial drying means that at least some of the excess benzyl alcohol 44 is removed from the three-dimensionally printed polyamide object 42". In one example, at least partial drying involves air drying. In this example, the three-dimensionally printed polyamide object 42" is allowed to sit until it is at least partially dried. In other examples, a fan, heater, etc. may be used to accelerate the drying process.

In these instances, the exposed and dried 3D printed polyamide object 42" may then be exposed to microwave irradiation. Any suitable conventional microwave oven 46 that is large enough to accommodate the 3D printed polyamide object 42" may be used. In one example, interior space of the microwave oven 46 ranges from about 0.5 cu. ft. to about 2 cu. ft. A larger microwave oven 46 may be used, depending upon the size and shape of the 3D printed polyamide object 42". In one example, microwave irradiation is performed with a microwave having a wattage ranging from about 500 W to about 2000 W. In an example, the microwave wattage is 700 W.

Microwave irradiation may be performed for a time period sufficient to initiate melting at a surface of the three-dimensionally printed polyamide object 42" and avoid melting of a bulk of the three-dimensionally printed polyamide object 42". In an example, the time period for microwave irradiation exposure ranges from about 30 seconds to about 4 minutes. The exposure time period may depend, in part, upon the size of the 3D object 42". For example, the time period for microwave irradiation exposure for smaller objects may range from about 30 seconds to about 50 seconds. For another example, the time period for microwave irradiation exposure for larger objects may range from about 45 seconds to about 4 minutes. The combination of heat during microwave irradiation and benzyl alcohol present on the surface, and in some instances penetrated into a portion of the depth of the 3D printed polyamide object 42", may help to solubilize the polyamide particles at the surface of the 3D printed polyamide object 42". The solubilized particles may dissolve and blend together, which can decrease overall surface roughness.

In examples where color is incorporated at the surface of the 3D object 42", the surface treatment method may remove some of the color. In these instances, it may be desirable to use the primer fusing agent 14' and the coloring agent to form the entire 3D object 42" or multiple layers at the exterior of the 3D object 42" so that the color is not deleteriously affected.

To further illustrate the present disclosure, an example is given herein. It is to be understood that this example is provided for illustrative purposes and is not to be construed as limiting the scope of the present disclosure.

EXAMPLE

Three control 3D printed polyamide dogbones, three example 3D printed polyamide dogbones, and three comparative 3D printed polyamide dogbones, were 3D printed.

For each dogbone, the polymeric build material was polyamide-12. The dogbones were 3D printed using an example of the layer-by-layer method disclosed herein (e.g., see FIG. 3). The fusing agent included carbon black as the electromagnetic radiation absorber. In each layer of polyamide build material, the fusing agent was inkjet printed in the dogbone pattern. Each patterned layer was exposed to IR radiation.

The control 3D printed polyamide dogbones were dried post-printing, but were not exposed to any other post-printing surface treatment method.

The example 3D printed polyamide dogbones were individually immersed in benzyl alcohol for 3 hours, and then were air dried so that excess benzyl alcohol was removed. After soaking and partial drying, each example 3D printed polyamide dogbones was placed in a conventional 700 W microwave oven and was microwaved for about 45 seconds.

The comparative example 3D printed polyamide dogbones were individually immersed in water for 3 hours, and then were air dried so that excess benzyl alcohol was removed. After soaking and partial drying, each comparative example 3D printed polyamide dogbone was placed in a conventional 700 W microwave oven and was microwaved for about 45 seconds.

Six comparative dogbones were also formed using injection molding (IM) using polyamide 12.

Three of the comparative IM dogbones (1-3) were individually immersed in benzyl alcohol for 3 hours, and then were air dried so that excess benzyl alcohol was removed. After soaking and partial drying, each of comparative IM dogbones 1-3 was placed in a conventional 700 W microwave oven and was microwaved for about 45 seconds.

Three of the comparative IM dogbones (4-6) were individually immersed in water for 3 hours, and then were air dried so that excess water was removed. After soaking and partial drying, each of comparative IM dogbones 4-6 was placed in a conventional 700 W microwave oven and was microwaved for about 45 seconds.

The surface roughness of i) the control 3D printed polyamide dogbones, the example 3D printed polyamide dogbones, ii) the comparative example 3D printed polyamide dogbones, and iii) the comparative IM dogbones 1-6 was measured using a Mitutoyo surface roughness gauge before the respective post-printing surface treatments (if any) and after the respective post-printing surface treatments (if any). The surface roughness measurements were collected at the top of the dogbones and are shown in Table 1. Table 1 also shows, in bold, the average of the three measurements.

TABLE 1

| Surface Roughness (μm) Prior to any Post-Print Surface Treatment | Surface Roughness (μm) After Post-Print Surface Treatment | % Change |
|---|---|---|
| Control 3D Printed Polyamide Dogbones | | |
| 5.130 | 5.081 | −1.0 |
| 5.142 | 5.074 | −1.3 |
| 5.101 | 5.062 | −0.8 |
| **5.124** | **5.07** | **−1.0** |
| Example 3D Printed Polyamide Dogbones | | |
| 4.494 | 3.753 | −16.5 |
| 4.357 | 3.687 | −15.4 |
| 4.295 | 3.653 | −14.9 |
| **4.382** | **3.70** | **−15.6** |
| Comparative Example 3D Printed Polyamide Dogbones | | |
| 3.894 | 3.732 | −4.2 |
| 3.971 | 3.726 | −6.2 |
| 3.955 | 3.733 | −5.6 |
| **3.94** | **3.73** | **−5.3** |
| IM Polyamide Dogbones 1-3 | | |
| 0.23 | 1.723 | 649.13 |
| 0.196 | 1.408 | 618.37 |
| 0.212 | 1.398 | 559.43 |
| **0.21** | **1.51** | **608.98** |
| IM Polyamide Dogbones 4-6 | | |
| 0.186 | 0.224 | 20.43 |
| 0.258 | 0.241 | −6.59 |
| 0.243 | 0.239 | −1.62 |
| **0.23** | **0.23** | **4.06** |

As illustrated in Table 1, the example 3D printed polyamide dogbones, which were exposed to benzyl alcohol and microwave irradiation, resulted in a 16% reduction in surface roughness. The example 3D printed polyamide dogbones also had the greatest reduction in surface roughness when compared to the control 3D printed polyamide dogbones (drying post-print) and the comparative example 3D printed polyamide dogbones (post-print surface treatment with water and microwave irradiation). The porosity of the 3D printed polyamide dogbones was expected to enable the benzyl alcohol to at least partially penetrate the dogbones at the surface. It is believed that when the benzyl alcohol was heated with microwave radiation, the benzyl alcohol solubilized the polyamide at and near the surface, enabling it to dissolve and blend and decrease surface roughness.

All of the comparative IM dogbones 1-3 exhibited an increase in surface roughness when treated post-print. The comparative IM dogbones 4-6 (post-print surface treatment with water and microwave irradiation) exhibited an average increase (about 4%) in surface roughness when treated post-print. The comparative IM dogbones 1-3 (post-print surface treatment with benzyl alcohol and microwave irradiation) had a significant average increase (>600%) in surface roughness. Injection molded parts have much less porosity than parts generated via 3D printing. The increase in surface roughness for the injection molded parts supports the expectations related to 3D printed part porosity.

It is to be understood that the ranges provided herein include the stated range and any value or sub-range within the stated range. For example, from about 0.01 wt % to about 5 wt % should be interpreted to include not only the explicitly recited limits of from about 0.01 wt % to about 5 wt %, but also to include individual values, such as about 0.25 wt %, about 0.55 wt %, about 1.74 wt %, about 2.03 wt %, about 3.2 wt %, about 5.5 wt %, etc., and sub-ranges, such as from about 0.2 wt % to about 4.8 wt %, from about 1 wt % to about 2 wt %, from about 0.05 wt % to about 3.75 wt %, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A surface treatment method, comprising:

exposing a final three-dimensionally printed polyamide object to benzyl alcohol, wherein the final three-dimensionally printed polyamide object is formed from a solid polyamide build material composition; and exposing the three-dimensionally printed polyamide object to microwave irradiation after the benzyl alcohol exposure, thereby reducing a surface roughness of the final three-dimensionally printed polyamide object;

wherein exposing the three-dimensionally printed polyamide object to the benzyl alcohol involves soaking the three-dimensionally printed polyamide object in the benzyl alcohol; and wherein the soaking is performed for a time period ranging from about 1 hour to about 25 hours;

wherein the surface treatment method is a post-print finishing technique.

2. The surface treatment method as defined in claim 1 wherein the soaking is performed for a time period ranging from about 2 hours to about 10 hours.

3. The surface treatment method as defined in claim 1 wherein exposing the three-dimensionally printed polyamide object to the microwave irradiation is performed for a time period sufficient to initiate melting at a surface of the three-dimensionally printed polyamide object and avoid melting of a bulk of the three-dimensionally printed polyamide object.

4. The surface treatment method as defined in claim 3 wherein the time period for microwave irradiation exposure ranges from about 30 seconds to about 4 minutes.

5. The surface treatment method as defined in claim 1 wherein the microwave irradiation is performed with a microwave having a wattage ranging from about 500 W to about 2000 W.

6. The surface treatment method as defined in claim 1 wherein exposing the three-dimensionally printed polyamide object to the benzyl alcohol is performed at a temperature ranging from about 18° C. to about 27° C.

7. The surface treatment method as defined in claim 1, further comprising at least partially drying the three-dimensionally printed polyamide object after exposing the three-dimensionally printed polyamide object to the benzyl alcohol and prior to exposing the three-dimensionally printed polyamide object to the microwave irradiation.

8. The surface treatment method as defined in claim 7 wherein the at least partially drying involves air drying.

9. A method, comprising:

forming a final 3D printed polyamide object by:

iteratively applying a solid polyamide build material composition to form respective build material layers;

based on a 3D object model, selectively applying a fusing agent on the respective build material layers to form respective patterned portions; and exposing the respective build material layers to electromagnetic radiation to selectively coalesce the patterned portions and form the final 3D printed polyamide object;

exposing the final 3D printed polyamide object to benzyl alcohol; and exposing the 3D printed polyamide object to microwave irradiation after the benzyl alcohol exposure, thereby reducing a surface roughness of the final 3D printed polyamide object;

wherein exposing the 3D printed polyamide object to the benzyl alcohol involves soaking the 3D printed polyamide object in the benzyl alcohol; and wherein the soaking is performed for a time period ranging from about 1 hour to about 25 hours;

wherein the exposing to benzyl alcohol and to microwave irradiation is a post-print finishing technique.

10. The method as defined in claim 9 wherein the soaking is performed for a time period ranging from about 2 hours to about 10 hours.

11. The method as defined in claim 9 wherein exposing the 3D printed polyamide object to the microwave irradiation is performed for a time period sufficient to initiate melting at a surface of the 3D printed polyamide object and avoid melting of a bulk of the 3D printed polyamide object.

12. The method as defined in claim 11 wherein the time period for microwave irradiation exposure ranges from about 30 seconds to about 4 minutes.

13. The method as defined in claim 9 wherein exposing the 3D printed polyamide object to the benzyl alcohol is performed at a temperature ranging from about 18° C. to about 27° C.

14. The method as defined in claim 9, further comprising at least partially drying the 3D printed polyamide object after exposing the 3D printed polyamide object to the benzyl alcohol and prior to exposing the 3D printed polyamide object to the microwave irradiation.

15. A three-dimensional printed polyamide object generated by the method of claim 9.

16. The surface treatment method as defined in claim 1 wherein a percent change in the surface roughness of the final three-dimensionally printed polyamide object from prior to the post-print finishing technique, to after the post-print finishing technique ranges from −14.9% to −16.5%.

17. The method as defined in claim 9 wherein a percent change in the surface roughness of the final 3D printed polyamide object from prior to the post-print finishing technique, to after the post-print finishing technique ranges from −14.9% to −16.5%.

* * * * *